(12) United States Patent
Park et al.

(10) Patent No.: US 10,794,861 B2
(45) Date of Patent: Oct. 6, 2020

(54) TANDEM ION MOBILITY SPECTROMETER

(71) Applicants: Bruker Scientific LLC, Billerica, MA (US); Florida State University Research Foundation, Inc., Tallahassee, FL (US)

(72) Inventors: Melvin Andrew Park, Billerica, MA (US); Mark Ridgeway, Stow, MA (US); Christian Bleiholder, Tallahassee, FL (US); Fanny Caroline Liu, Tallahassee, FL (US)

(*) Notice: Subject to any disclaimer, the term of this patent is extended or adjusted under 35 U.S.C. 154(b) by 0 days.

(21) Appl. No.: 16/262,224

(22) Filed: Jan. 30, 2019

(65) Prior Publication Data
US 2019/0265195 A1 Aug. 29, 2019

Related U.S. Application Data

(60) Provisional application No. 62/634,412, filed on Feb. 23, 2018.

(51) Int. Cl.
*G01N 27/62* (2006.01)
*H01J 49/00* (2006.01)
*H01J 49/40* (2006.01)

(52) U.S. Cl.
CPC ........ *G01N 27/622* (2013.01); *H01J 49/0031* (2013.01); *H01J 49/0045* (2013.01); *H01J 49/0059* (2013.01); *H01J 49/0072* (2013.01); *H01J 49/40* (2013.01)

(58) Field of Classification Search
CPC ............... G01N 27/622; H01J 49/0031; H01J 49/0045; H01J 49/0059; H01J 49/0072; H01J 49/40

USPC ........ 250/281, 282, 283, 288, 290, 291, 292
See application file for complete search history.

(56) References Cited

U.S. PATENT DOCUMENTS

| 9,741,552 B2* | 8/2017 | Park | G01N 27/622 |
| 10,241,079 B2* | 3/2019 | Betz | G01N 27/622 |
| 10,408,792 B2* | 9/2019 | Betz | G01N 27/622 |

FOREIGN PATENT DOCUMENTS

GB 2534431 7/2016

OTHER PUBLICATIONS

Shvarsburg, A. et al. "Fundamentals of Traveling Wave Ion Mobility Spectrometry", Anal Chem. Dec. 15, 2008; 80(24): 9689-9699.
Young, C.E., et al. "Water Cluster Ions: Rates of Formation and Decomposition of Hydrates of the Hydronium Ion", The Journal of Chemical Physics 53, 4295 (1970).
Hoaglund, C.S., et al. "Three-Dimensional Ion Mobility/TOFMS Analysis of Electrosprayed Biomolecules", Anal. Chem. 1998, 70, 2236-2242.
Koeniger, Stormy L., et al. "An IMS-IMS Analogue of MS-MS", Anal. Chem. 2006, 78, 4161-4174.
Merenbloom, Samuel I. et al., "Assessing the Peak Capacity of IMS-IMS Separations of Tryptic Peptide Ions in He at 300K", Analytical Chemistry, vol. 79, No. 2, Dec. 1, 2006.

(Continued)

*Primary Examiner* — Nicole M Ippolito
(74) *Attorney, Agent, or Firm* — Benoit & Côté Inc.

(57) ABSTRACT

The invention proposes a methods and devices for tandem ion mobility spectrometry using at least one TIMS analyzers (TIMS=trapping ion mobility spectrometry), in particular in the field of structural biology.

21 Claims, 12 Drawing Sheets

(56) References Cited

OTHER PUBLICATIONS

Michelmann, Karsten et al., "Fundamentals of Trapped Ion mobility Spectrometry", Journal of the American Society for Mass Spectrometry, Elsevier Science Inc., US, vol. 26, No. 1, Oct. 21, 2014.
F. A. Fernandez-Lima et al., "Integration of trapped ion mobility spectrometry with mass spectrometry", Review of Scientific Instruments, AIP, Melville, NY, US, vol. 82, No. 12, Dec. 1, 2011.
Ridgeway, Mark E. et al., "Trapped ion mobility spectrometry: A short review", International Journal of Mass Spectrometry, Elsevier Science Publishers, Amsterdam, NL, vol. 425, Jan. 9, 2018.
Pierson, Nicholas A. et al., "An IMS-IMS threshold method for semi-quantitative determination of activation barriers: Interconversion of proline cis <-> trans forms in triply protonated bradykinin", International Journal of Mass Spectrometry., vol. 377, Jul. 6, 2014.

\* cited by examiner

TANDEM ION MOBILITY SPECTROMETER

BACKGROUND OF THE INVENTION

Field of the Invention

The invention relates to methods and devices for tandem ion mobility spectrometry (IMS), in particular coupled with mass spectrometry (MS) and tandem mass spectrometry (tandem MS) and used in the field of structural biology.

Description of the Related Art

Ion mobility spectrometry is an analytical technique that is used to investigate the mobility of ions in a buffer gas and to separate them according to their mobility.

An inherent feature of ion mobility spectrometry is that the mobility of ions in a buffer gas depends on molecular geometries of the ions such that it is often possible to resolve and thus separate isomers or conformers that cannot be resolved by mass spectrometry. Many applications also take advantage of the ability to determine the cross section of an analyte ion from its measured mobility. Knowledge of cross sections has proven to be significant in many areas including identifying compound class and detailed structure, in particular in the field of structural biology.

Structural biology is a branch of molecular biology, biochemistry, and biophysics concerned with the molecular structure of biological macromolecules. A macromolecule is a molecule of relative high molecular mass (usually higher than 10,000 Da), the structure of which essentially comprises multiple repetition of monomeric subunits derived from molecules of relative low molecular mass, in particular proteins, made up of amino acids, and RNA or DNA, made up of nucleic acids. Structural biology tries to answer how macromolecules acquire their structures and how alterations in their structures affect their function. This subject is of great interest to biologists because macromolecules carry out most of the functions of cells, and it is by folding into three-dimensional structures that they are able to perform these functions. The primary structure of a macromolecule is equivalent to specifying the sequence of its monomeric subunits, such as amino acids and nucleic acids. The secondary structure is the pattern of hydrogen bonds in a macromolecule which determine the local segments of the macromolecule, but does not describe the global structure in three-dimensional space, which are considered to be tertiary structure.

IMS analyzers exist based on various principles.

A drift type IMS instrument measures how long an ion takes to traverse a gas filled drift tube when a uniform stationary electric DC field is acting on the ion. In specified intervals, a pulse of ions is injected into the drift tube. For injecting the ion pulse, an ion gate such as a Bradbury-Nielsen gate or a Tyndall gate is used. Once in the drift tube, the ions are subjected to the uniform electric field ranging from a few volts per centimeter up to many hundreds of volts per centimeter. The electric field drives the ions through the drift tube, where they collide with the neutral atoms/molecules of the buffer gas and separate based on their ion mobility, towards an ion detector. Ions are recorded at the ion detector in order from the fastest (highest ion mobility) to the slowest (lowest ion mobility).

A TW-IMS instrument (TW=travelling wave) uses a non-uniform transient electric DC field. The electric DC field is only applied in a limited region of a drift tube and this region then moves along the drift tube, creating a travelling wave. A sequence of waves continually propagating through the drift tube propels ions, which are injected as a pulse of ions into the drift tube, towards an ion detector with velocity depending on mobility such that different ion species transit the drift tube in different drift times. A TW-IMS analyzer is commonly operated at low pressures of around 20 Pa and uses an electric RF field for radially confining the ions. Regarding the theoretical basis of TW-IMS, see the article "Fundamentals of Traveling Wave Ion Mobility Spectrometry" by Svartsburg et al. (Anal. Chem., 2008, 80(24), 9689-9699).

In TIMS instruments (TIMS=trapped ion mobility spectrometry), ions are at first trapped along a non-uniform electric DC field (electric field gradient, EFG) by a counteracting gas flow or along a uniform electric DC field by a counteracting gas flow which has a non-uniform axial velocity profile (gas velocity gradient). The trapped ions are at first separated in space in a TIMS analyzer according to mobility and subsequently eluted from the TIMS analyzer over time according to their mobility by adjusting one of the gas velocity and the height of axial electric DC field (U.S. Pat. No. 6,630,662 B1 by Loboda; U.S. Pat. No. 7,838,826 B1 by Park). A TIMS analyzer is commonly operated in the low pressure range of 2 to 500 Pa and uses an electric RF field for radially confining the ions. Regarding the theoretical basis of TIMS, see the article "Fundamentals of Trapped Ion Mobility Spectrometry" by Michelmann et al. (J. Am. Soc. Mass Spectrom., 2015, 26, 14-24).

Several groups have coupled drift type IMS instruments to mass spectrometers (MS and tandem MS) and liquid chromatography (LC) instruments to characterize complex biological mixtures (Young et al., J. Chem. Phys., 1970, 53, 4295-4302; Hoaglund et al., Anal. Chem., 1998, 70, 2236). Later on, the Clemmer group developed a drift type IMS instrument for tandem IMS (Koeninger et al., Anal. Chem. 2006, 78, 4161). In this article, the authors describe that it is possible to disperse a mixture of precursor ions on the basis of different drift times in a first drift type IMS analyzer and select ions of specified mobility for collisional activation. The fragments, or new conformations, that are formed by the collisional activation are then separated in a second drift type IMS analyzer before further analysis by MS. This tandem IMS approach is analogous to the well-known tandem MS (also termed MS/MS and $MS^2$) strategies, but the separations of the initial precursor and fragment ions are based on mobility rather than mass-to-charge (m/z) ratios.

There is still a need for instruments and methods for analyzing ions by tandem IMS, in particular with respect to the structure of biomolecules, more particular with respect to the primary and tertiary structure of macromolecules, by applying different activation and fragmentation techniques.

SUMMARY OF THE INVENTION

In a first aspect, the invention provides a method for analyzing ions comprising the steps of providing ions from an ion source to a first ion mobility analyzer, separating the ions according to mobility in the first ion mobility analyzer, selecting precursor ions of at least one limited mobility range, fragmenting the selected precursor ions into fragment ions, trapping the fragment ions in a second ion mobility analyzer, separating the fragment ions according to mobility in the second ion mobility analyzer, and detecting the separated fragment ions, wherein the second ion mobility analyzer is a trapped ion mobility spectrometry (TIMS)

analyzer. The mobility of the fragment ions can be determined from detected ion signals of the separated fragment ions.

The steps of separating in the first ion mobility analyzer, selecting and fragmenting can be repeated while the second ion mobility analyzer is operated to accumulate the repeatedly fragmented ions prior to separating them according to mobility.

The ions can be temporally separated according to mobility in the first ion mobility analyzer, and then ions of one or more limited mobility ranges are selected by adjusting the transmission of an ion gate. In particular two or more disjointed mobility ranges can be selected. In a preferred embodiment, the ion gate can comprise at least two annular electrodes, and the transmission of the ion gate is adjusted by applying attracting electric DC potentials to the at least two annular electrodes during the selection interval and by applying repelling electric DC potentials to the at least two annular electrodes outside the selection interval.

The ions can also be spatially separated according to mobility in the first ion mobility analyzer if the first ion mobility analyzer is a trapped ion mobility spectrometry (TIMS) analyzer. The ions are trapped along an electric DC field gradient or along a gas velocity gradient of the first TIMS analyzer and then the strength of the electric DC field or the gas velocity can be adjusted such that only ions of a limited mobility range can leave the first TIMS analyzer towards the second TIMS analyzer while unselected ions stay trapped in the TIMS analyzer. Otherwise, a subset of the ions trapped inside the first TIMS analyzer can selectively be reacted or activated at specific axial positions to change mobility, for example by multiple photon absorption or by collision induced activation in dipolar or rotational acting electric AC fields, such that only the activated or reacted ions can leave the first TIMS analyzer towards the second TIMS analyzer, in particular without an adjustment of trapping parameters of the first TIMS analyzer. The energy introduced into the activated ions can be varied in order to provide selected ions of different conformations for the fragmentation step. Preferably, the first TIMS analyzer comprises an electric DC field barrier and a counteracting gas flow which is directed downstream towards an ion detector, and the ions are pushed by the gas flow against a rising edge of the electric DC barrier where the ions of a limited mobility range are preferably trapped close to the apex of the rising edge.

The at least one mobility range can substantially correspond to the smallest mobility range that can be resolved by the first ion mobility analyzer. However, it can also be greater or smaller than the resolvable mobility range of the first ion mobility analyzer. The limited mobility range can correspond to the mobility spread of a single ion species or a specific conformation of an ion species, but also be less than that.

The ions can for example be generated by electrospray ionization at ambient or sub-ambient pressure, matrix-assisted laser desorption/ionization, or chemical ionization.

The selected ions can be fragmented between the first and the second ion mobility analyzer or inside the second ion mobility analyzer. The ions can be fragmented by one of collision induced dissociation (CID), surface induced dissociation (SID), photo-dissociation (PD), electron capture dissociation (ECD), electron transfer dissociation (ETD), collisional activation after electron transfer dissociation (ETcD), activation concurrent with electron transfer dissociation (AI-ETD) and fragmentation by reactions with highly excited or radical neutral particles. The photo-dissociation preferably comprises infrared multiple photon-dissociation (IRMPD) and ultraviolet photo-dissociation (UVPD). The selected ions can additionally be activated prior to fragmentation, and the fragment ions can all or selectively be activated during trapping, for example by multiple photon absorption or by collision induced activation in dipolar or rotational acting electric AC fields. The activation energy introduced into the selected ions or fragment ions can be varied in order to determine the mobility of the fragment ions as a function of activation energy.

The fragment ions are preferably detected in a mass analyzer located downstream of the second ion mobility analyzer. The mass analyzer can be one of a quadrupole mass filter, a time-of-flight mass analyzer, a time-of-flight mass analyzer with orthogonal ion injection, a RF ion trap, a DC ion trap (like an orbitrap or cassini-trap) and an ion-cyclotron-resonance trap. The fragment ions can further be analyzed by acquiring fragment mass spectra of them.

Prior to the first mobility separation, the ions can be filtered according to mass in a mass filter located upstream of the first ion mobility analyzer. After selection and prior to fragmentation, the selected ions can by filtered according to mass.

The selected ions can be trapped and fragmented in the second ion mobility analyzer. The trapping time of the selected ions prior to fragmentation can be varied in subsequent measurements in order to determine the mobility of fragment ions as a function of time, particularly if the selected ions have been activated prior to the fragmentation. In the same way, the trapping time of the fragment ions prior to their separation according to mobility can be varied. The time-resolved determination of mobility can give insight into the temporal change of conformations and thus structural information of the selected ions. The trapping time prior to or after fragmentation as well as duration of the fragmentation can be longer than 0.1 ms, in particular longer than 1 ms, more particularly longer than 10 ms.

In a first embodiment, selected ions are fragmented by collision induced dissociation which results from accelerating the selected ions in or into a gas filled region between the first and the second ion mobility analyzer by applying electric DC potentials to at least two annular electrodes which are located between the first and the second ion mobility analyzer.

The electric field strength between the at least two annular electrodes is preferably higher than 50 V/cm, in particular higher than 100 V/cm, more particularly up to 1000 V/cm. The potential difference between the at least two annular electrodes is preferably more than 50, 100, 200 or 500 Volts.

The collision gas in the gas filled region can be substantially equal to the buffer gas used in one of the ion mobility analyzers and preferably comprises at least partly a gas component having an atomic mass of more than 28 Da. The collision gas in the gas filled region can also be a mixture of buffer gas used in one of the ion mobility analyzers and a gas component which is additionally introduced from a gas supply into the gas filled region and preferably has an atomic mass of more than 28 Da. The gas component is preferably one of argon, carbon dioxide and sulfur hexafluoride. The pressure of the collision gas is between 1 Pa and 10,000 Pa, in particular between 10 Pa and 1000 Pa, more particular between 100 Pa and 500 Pa.

In a second embodiment, the second ion mobility analyzer (TIMS analyzer) comprises an electric DC field barrier with a rising edge and a counteracting gas flow. The selected ions are pushed by the gas flow, which is directed downstream towards an ion detector, against the rising edge and trapped at the rising edge. Photons are introduced at a location of the rising edge where the selected ions are trapped inside the second ion mobility analyzer for inducing photo-dissociation of the selected ions. The selected ions can also be fragmented at their trapping position by locally generating electric AC fields which accelerate the selected ions in a radial and/or axial direction for inducing collisional induced dissociation.

In a third embodiment, the second ion mobility analyzer (TIMS analyzer) comprises an electric DC field barrier with a rising edge and a counteracting gas flow. The selected ions are pushed by the gas flow, which is directed downstream towards an ion detector, against the rising edge and trapped at the rising edge. Negatively charged ETD reactant ions are transferred to the front part of the rising edge and pass through the rising edge where they react with the selected ions and induce electron transfer dissociation.

In a fourth embodiment, the second ion mobility analyzer (TIMS analyzer) comprises an electric DC field barrier with a rising edge and a counteracting gas flow. The selected ions are pushed by the gas flow, which is directed downstream towards an ion detector, against the rising edge and trapped at the rising edge. Highly excited or radical neutral particles are transferred to the front part of the rising edge and pass through the rising edge where they react with the selected ions and induce fragmentation.

In a fifth embodiment, the selected ions are activated prior to fragmentation, e.g. by collision induced activation, single photon absorption or multiple photon absorption. Preferably, the activation energy introduced into the selected ions is varied and the mobility of the fragment ions is determined as a function of activation energy. Optionally, the mobility of the fragment ions can be measured as a function of trapping time. The measured distribution of mobility of the fragment ions can in particular be used to determine structural information of the selected ions, in particular of selected macromolecular ions.

The analyzed ions are preferably ions of macromolecules with an atomic mass higher than 10,000 Da, in particular higher than 50,000, more particularly higher than 100,000 Da. The selected ions can for example be ions of biomolecules, in particular of proteins. In particular, the analyzed ions can be ions of non-covalently bound complexes wherein at least one of the binding partners is a macromolecule.

In a second aspect, the invention provides a method for analyzing ions comprising the steps of providing ions from an ion source to a first ion mobility analyzer, separating the ions according to mobility in the first ion mobility analyzer, selecting ions of at least one limited mobility range, activating or reacting the selected ions, trapping the activated or reacted ions in a second ion mobility analyzer, separating the trapped ions according to mobility in the second ion mobility analyzer, and detecting the separated ions wherein the second ion mobility analyzer is a trapped ion mobility spectrometry (TIMS) analyzer. The mobility of the activated or reacted ions can be determined from detected ion signals of the separated fragment ions.

The selected ions can be activated or reacted between the first and the second ion mobility analyzer or inside the second ion mobility analyzer while they are trapped. The activation energy introduced into the selected ions can be varied in subsequent measurements in order to determine the mobility of the activated ions as a function of activation energy.

If the first ion mobility analyzer is a trapped ion mobility spectrometry (TIMS) analyzer, the ions can be trapped and spatially separated according to mobility in the first ion mobility analyzer. A subset of the ions trapped inside the first TIMS analyzer can selectively be reacted or activated at specific axial positions to change their mobility, for example by multiple photon absorption or by collision induced activation in dipolar or rotational acting electric AC fields, such that only the activated or reacted ions can leave the first TIMS analyzer towards the second TIMS analyzer.

The ions can be temporally separated according to mobility in the first ion mobility analyzer and then ions of the at least one limited mobility range are selected by adjusting the transmission of an ion gate, for example a Tyndall-gate or a Bradbury-Nielson gate. If the first ion mobility analyzer is a trapped ion mobility spectrometry (TIMS) analyzer, ions can also be spatially separated according to mobility in the first ion mobility analyzer and then only the ions of a limited mobility range are released from the first ion mobility analyzer by an adjustment of a trapping parameter of the first TIMS analyzer.

The selected ions can for example be reacted by hydrogen-deuterium exchange reaction. The selected ions can be activated by being accelerated in or into a gas filled region or by radiative heating, for example by absorbing multiple infrared photons provided by an infrared laser or infrared laser diode.

The trapping time of the activated or reacted ions prior to their separation according to mobility can be varied in subsequent measurements in order to determine the mobility of activated or reacted ions as a function of time. The time-resolved determination of mobility can give insight into the temporal change of conformations and thus structural information of the selected ions. The trapping time prior the second mobility separation as well as duration of the activation or reaction can be longer than 0.1 ms, in particular longer than 1 ms, more particularly longer than 10 ms.

The analyzed ions are preferably ions of macromolecules with an atomic mass higher than 10,000 Da, in particular higher than 50,000, more particularly higher than 100,000 Da. The selected ions can for example be ions of biomolecules, in particular of proteins. In particular, the analyzed ions can be ions of non-covalently bound complexes wherein at least one of the binding partners is a macromolecule.

In a third aspect, the invention provides an ion mobility mass spectrometer comprising an ion source, a first ion mobility analyzer, a second ion mobility analyzer located downstream of the first ion mobility analyzer, a fragmentation or activation cell which is located between the first and the second ion mobility analyzer or is part of the second ion mobility analyzer and an ion detector wherein the second ion mobility analyzer is a trapped ion mobility spectrometry (TIMS) analyzer.

The ion source can comprise means for electrospray ionization at atmospheric pressure or sub-ambient pressure, matrix-assisted laser desorption/ionization, or chemical ionization.

The first mobility analyzer is preferably a trapped ion mobility spectrometry (TIMS) analyzer. Both TIMS analyzers can comprise the same gas composition or different gas compositions, in particular they can be decoupled with regard to the gas flows. More preferably, the first ion mobility analyzer is a TIMS analyzer and comprises an electric DC field barrier with a rising edge and a gas flow which is directed downstream towards the second ion mobility analyzer. The first mobility analyzer can alternatively be a drift type ion mobility analyzer.

The ion mobility spectrometer can further comprise an ion gate located between the first and the second ion mobility analyzer and a DC generator connected to the ion gate for supplying transient electric DC potentials to the ion gate. The ion gate can be one of an ion-optical einzel lens, a Tyndall gate and a Bradbury-Nielsen gate. The ion gate preferably comprises at least two annular electrodes, and the DC generator is configured to supply attracting electric DC (first state) and repelling electric DC (second state) potentials to the at least two annular electrodes.

The fragmentation cell can comprise means for collision induced dissociation (CID), surface induced dissociation (SID), photo-dissociation (PD), infrared multiple photo-dissociation (IRMPD), ultraviolet photo-dissociation (UVPD), electron capture dissociation (ECD), electron transfer dissociation (ETD), collisional activation after electron transfer dissociation (EThcD), activation concurrent with electron transfer dissociation (AI-ETD) or fragmentation by reactions with highly excited or radical neutrals. The activation cell can comprise means for radiative heating, for example an infrared laser or an infrared laser diode, or means for generating dipolar or rotational acting electric AC fields.

In a first embodiment, the fragmentation cell comprises at least two annular electrodes, which are supplied with accelerating electric DC potentials, and a gas filled region which is located between or downstream of the at least two annular electrodes. The electric field strength between the at least two annular electrodes is preferably higher than 50 V/cm, in particular higher than 100 V/cm, more particularly up to 1000 V/cm. The potential difference between the at least two annular electrodes is preferably more than 50 V, in particular more than 200 V, more particular more than 500 V.

The gas filled region can substantially comprise buffer gas used in one of the ion mobility analyzers wherein the buffer gas comprises at least partly a gas component having an atomic mass of more than 28 Da. The fragmentation cell can further comprise a gas supply connected to the gas filled region for providing an additional gas component to buffer gas used in one of the ion mobility analyzers wherein the provided gas component has an atomic mass of more than 28 Da. The gas component can for example be argon, carbon dioxide or sulfur hexafluoride. The pressure of the collision gas in the gas filled region is preferably between 1 Pa and 10,000 Pa, in particular 10 Pa and 1000 Pa, more particular between 100 Pa and 500 Pa.

In a second embodiment, the second ion mobility analyzer comprises an electric DC field barrier with a rising edge and a gas flow, which is counteracting the electric DC field along the rising edge and is directed downstream. The fragmentation cell as well as the activation cell can comprise an infrared light source, in particular a laser or a laser diode, and an optical element for focusing the emitted light along the axis or onto one or more specific positions inside the trapping region of the second ion mobility analyzer.

In a third embodiment, the fragmentation cell comprises a second ion source configured to generate negative reactant ions for electron transfer dissociation (ETD) and an ion guide with an inlet at the second ion source and outlet at the second ion mobility analyzer. The second ion mobility analyzer comprises an electric DC field barrier with a rising edge and a gas flow, which is counteracting the electric DC field and is directed downstream. The outlet of the ion guide between the second ion source and the second ion mobility analyzer is located upstream or near the front part of the rising edge.

In a fourth embodiment, the fragmentation cell comprises a source of highly excited or radical neutral particles suitable to induce fragmentation of precursor ions and a feed for supplying the highly excited or radical neutral particles to the fragmentation cell. The second ion mobility analyzer preferably comprises an electric DC field barrier with a rising edge and a gas flow, which is counteracting the electric DC field along the rising edge and is directed downstream. The feed connects the source of the highly excited or radical neutral particles to a region of the second ion mobility analyzer which is upstream or near the front of the rising edge.

The ion detector can be a faraday ion detector or an ion detector with a secondary electron multiplier or an inductive ion detector. Preferably the ion detector is a mass analyzer, in particular one of a quadrupole mass filter, time-of-flight mass analyzer, a time-of-flight mass analyzer with orthogonal ion injection, a RF ion trap, a DC ion trap (like an orbitrap or cassini-trap) and ion-cyclotron-resonance trap. The ion mobility spectrometer can further comprise a second fragmentation cell between the second ion mobility analyzer and the mass analyzer.

The ion mobility spectrometer can further comprise a mass filter between the ion source and the first ion mobility analyzer or between the first ion mobility analyzer and the fragmentation cell. The mass filter can be a band-pass mass filter, like a quadrupole mass filter, a low-pass filter or a high-pass filter, like a Loeb-Eiber mass filter.

BRIEF DESCRIPTION OF THE DRAWINGS

The invention can be better understood by referring to the following figures. The components in the figures are not necessarily to scale, emphasis instead being placed upon illustrating the principles of the invention (often schematically). In the figures, like reference numerals designate corresponding parts throughout the different views.

DETAILED DESCRIPTION

Figure 1:
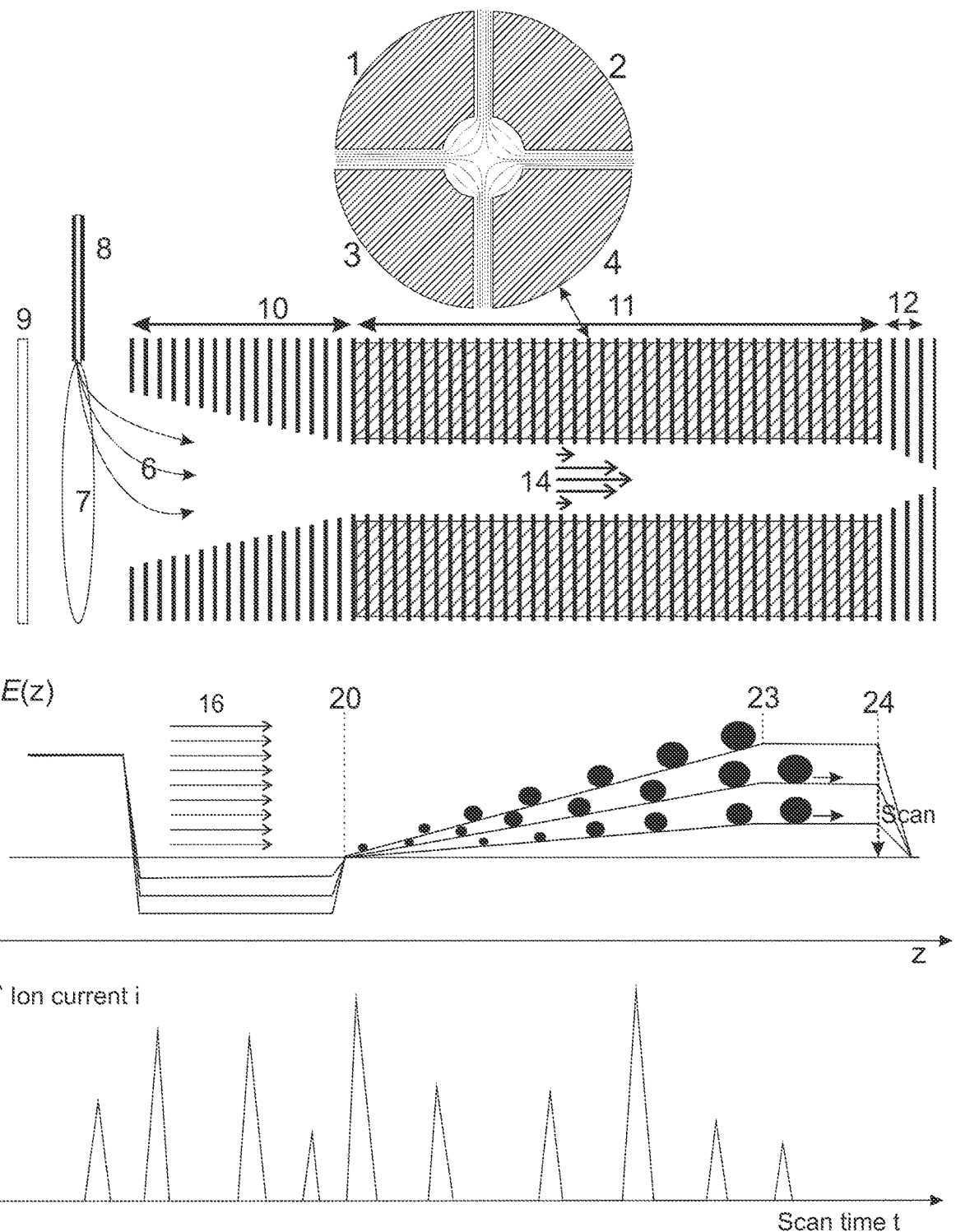
FIG. 1 shows the device and operation of a trapped ion mobility spectrometry (TIMS) analyzer known from prior art. Top: Scheme of the TIMS analyzer. Center: The field strength of the electric DC field barrier along the z axis (axial direction). The size of the dots on the rising edge of the electric DC field barrier reflects the mobility of the trapped ions. The lowering scan of the electric DC field barrier releases the ion bunches in sequence of their mobilities. Bottom: The ion current of ion pulses separated in time according to mobility, representing an ion mobility spectrum.

While the invention has been shown and described with reference to a number of different embodiments thereof, it will be recognized by those of skill in the art that various changes in form and detail may be made herein without departing from the scope of the invention as defined by the appended claims.

There is a strong interest in the use of ion mobility spectrometry-mass spectrometry (IMS-MS) instrumentation for structural biology. IMS-MS measurements are used to determine momentum transfer cross sections and to reconstruct the three-dimensional analyte structure of macromolecules. Nevertheless, it remains challenging to infer a three-dimensional structure from a singular cross section measured by IMS-MS. This is rooted in the fact that a cross section is inherently an orientation-averaged (effective) area of the analyte and thus does not directly contain detailed information about the three-dimensional structure of the analyte.

According to the present invention, the product ions are generated and trapped in a TIMS analyzer prior to a second separation according to mobility (tandem IMS). Product ions can be fragment ions, ions of changed conformations after an activation or reactant ions of a chemical reaction in the gas phase. The duration of trapping can be adjusted without changing essential operating parameters of the second ion mobility analyzer, in particular without decreasing the performance of the second mobility separation. Furthermore, the tandem IMS according to the present invention features a compact design with a length of less than 200 mm (in particular less than 100 mm) which is much smaller than tandem IMS known from prior art which use two drift type ion mobility analyzers.

According to the present invention, trapping of fragment ions allows to thermalize these ions prior to the second mobility separation and thus to reduce the distribution of conformations which can be important if the fragmentation process has increased the internal energy of the fragment ions. Furthermore, trapping of the selected ions in the second ion mobility analyzer allows applying fragmentation or activation techniques which do not act instantaneously, like multiple photon dissociation, and/or have a low reaction rates and need therefore relatively long time, like electron transfer dissociation. Additionally, the degree of activation and/or fragmentation can be controlled by the trapping time if the reaction or fragmentation takes place during the trapping. Furthermore, the adjustment of the trapping time allows to determine the mobility distribution of these ions as function of time which gives insight into their structures and structural changes, particularly if the selected ions have been activated prior to the fragmentation.

If the first mobility analyzer is a TIMS analyzer, the ions provided from the ion source can be trapped in the first ion mobility analyzer and the trapping time can be varied. Ions generated from a liquid sample, like in an ESI source, can comprise different conformations depending on the time they have to unfold from the liquid phase state to the gas phase state. The variation of the trapping time in the first TIMS analyzer allows to select and analyze different conformations and to determine structural characteristics of these conformations and of conformational changes.

Referring now to FIG. 1, one illustrative embodiment of a TIMS analyzer known from prior art is shown (U.S. Pat. No. 7,838,826 B1 by Park).

Entrained by a gas (7), ions (6) from an electrospray ion source (not shown) are introduced via transfer capillary (8) into a first chamber of a vacuum system. A repeller plate (9) drives ions (6) into an entrance funnel (10) of the mobility analyzer. Ion funnels (10, 12) usually are built as a stack of annular electrodes the openings of which taper to smaller diameters thus forming an inner volume in the shape of a funnel. Two phases of an RF voltage are applied alternately to the annular electrodes to build up a pseudopotential which keeps the ions away from the funnel walls. The ions are driven to and through the narrow end of the first funnel (10) into the TIMS tube (11) by an axial gas flow (14) and optionally by an additional DC potential gradient along the annular electrodes.

The axial gas flow (14) through the TIMS tube (11) is laminar and shows, in radial direction, a substantially parabolic velocity distribution. Nitrogen may serve as a preferred gas. The vacuum conditions around the TIMS tube (11) are chosen such that the maximum gas velocity amounts to about 100 to 150 meters per second, at a pressure of a few hectopascals. This velocity is only achieved near the axis. Further off axis, the velocity is considerably smaller, as indicated by arrows (14).

The first funnel (10) guides the ions into the TIMS tube (11) forming a tunnel with internal RF quadrupole field in radial direction. The TIMS tunnel (11) comprises a stack of thin electrodes with central holes which form a circular tube arranged around the z-axis of the device. The thin electrodes are separated by insulating material closing the gaps between the electrodes around the tube. The electrodes of the TIMS tube (11) are segmented into quadrants (1, 2, 3, 4), to allow for the generation of a radially confining quadrupolar electric RF field inside. The quadrants (1, 2, 3, 4) of the tube electrodes are shown at the top of FIG. 1 with equipotential lines of the quadrupolar RF field inside the tube at a given time. It should be mentioned here that the design of a quadrupole tunnel does not necessarily consist of metal electrode sheets; there are a lot of different possibilities including stacked PCB boards or even a rolled PCB board with printed electrodes.

Inside the TIMS tunnel (11), the ions are pushed by the gas flow (14) against an axial electric DC field barrier. In the center part of FIG. 1, the profile of the axial electric DC field barrier is shown for three phases of a scan. Between z locations (20) and (23), the electric DC field increases linearly, generated by a quadratically increasing electric potential. Between z locations (23) and (24), the electric DC field remains constant, forming a plateau of the electric DC field barrier, generated by a linear increase of the electrical potential. In a simple device, for instance, the complete field profile can be generated by a single voltage, applied to the annular electrode at location (24), and divided by precision resistors along the annular electrodes of the TIMS tube (11). The resistors between location (20) and (23) increase linearly, the resistors between (23) and (24) have equal resistance. In more complex devices, non-linear electric field profiles may be generated; even adjustable DC field profiles, e.g. by digital-to-analog converters (DAC).

The operation of the TIMS analyzer starts with an accumulation phase (trapping phase), accumulating ions on the uppermost electric DC field ramp of the diagram. A voltage difference on the order of 300 volts produces the electric DC field barrier. The ions are pushed by the gas flow, symbolically indicated by the arrows (16), against the electric DC field barrier and are stopped there because they cannot surmount the electric DC field barrier. It should be noted that the arrows (16) represent the maximum gas velocity of the parabolic gas velocity distribution (14) within the tube. The ions are accumulated on the rising edge of the electric DC field between locations (20) and (23), where ions of low mobility (mainly heavy ions with large collision cross section) gather in the high field near the upper end of the field ramp, whereas ions of high mobility gather in the low field near the foot of the ramp. The size of the dots represents the cross section of the trapped ions. In the subsequent "scan phase", the supply voltage for the electric DC field barrier is steadily decreased, and ions of increasing mobility can escape towards an ion detector, particularly to a mass analyzer operating as ion detector. In the bottom of the figure, the resulting ion current of the released ion species is shown. The measured total ion current curve i=f(t) presents directly an ion mobility spectrum from low ion mobilities to high ion mobilities.

The TIMS achieves a high level of performance (R>250) in a small device using modest operating potentials and can be coupled with nearly any mass analyzer. The resolving power depends on the ion mobility and increases for less mobile ions, which is of particular advantage for separating macromolecules according to mobility.

Figure 2:
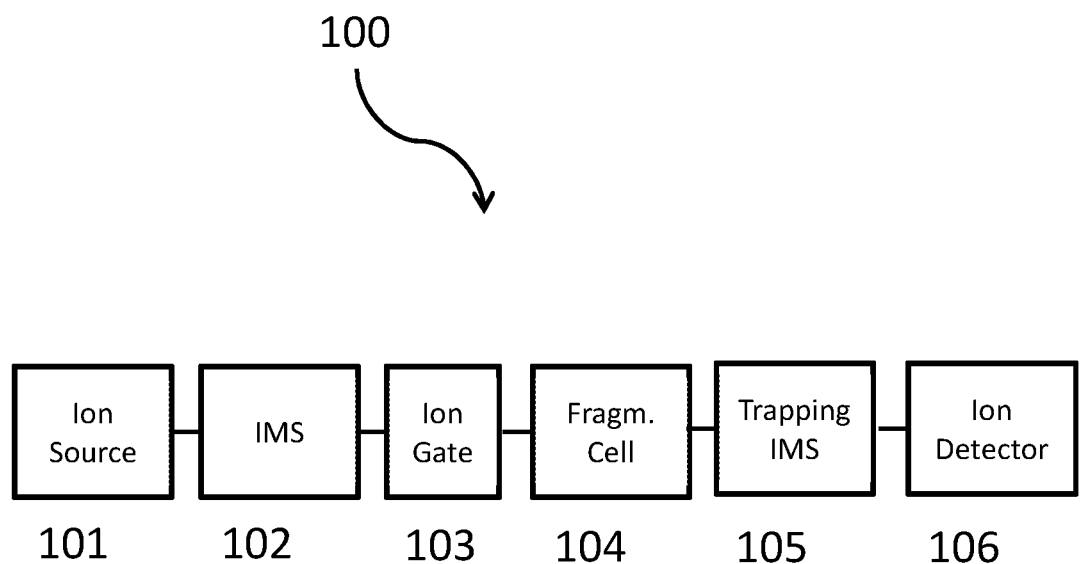
FIG. 2 shows an ion mobility spectrometer (100) according to the invention which comprises an ion source (101), a first ion mobility analyzer (102), an ion gate (103), a fragmentation cell (104), a TIMS analyzer (105) as second ion mobility analyzer and an ion detector (106).

Referring now to FIG. 2, an ion mobility spectrometer (100) according to the invention is shown which comprises an ion source (101), a first ion mobility analyzer (102), an ion gate (103), a fragmentation cell (104), a TIMS analyzer (105) as second ion mobility analyzer and an ion detector (106).

The ion source (101) is an atmospheric pressure electrospray (AP-ESI) ion source coupled to a syringe pump or a liquid chromatography system for supplying a sample (not shown). Ions generated in the AP-ESI source (101) are transferred to the first ion mobility analyzer (102) which is for example a drift type ion mobility analyzer or, more preferably, a TIMS analyzer. The ions delivered from the AP-ESI source (101) are separated according to mobility in time by the first ion mobility analyzer (102). The ion gate (103) is operated to temporally select ions of a limited mobility range from the separated ions. The ion gate can be an ion-optical einzel lens, a Tyndall gate or a Bradbury-Nielsen gate. The selected ions of the limited mobility range are then fragmented in a fragmentation cell (104). The ion gate (103) and the fragmentation cell (104) are separated devices and located between the first and the second ion mobility analyzers. The fragmented ions are transferred to the TIMS analyzer (105) where they are trapped and then separated according to mobility. The separated fragment ions are detected in an ion detector (106), which can be a faraday detector, inductive detector or an ion detector with a secondary electron multiplier, like a multi-channel plate.

Figure 3:
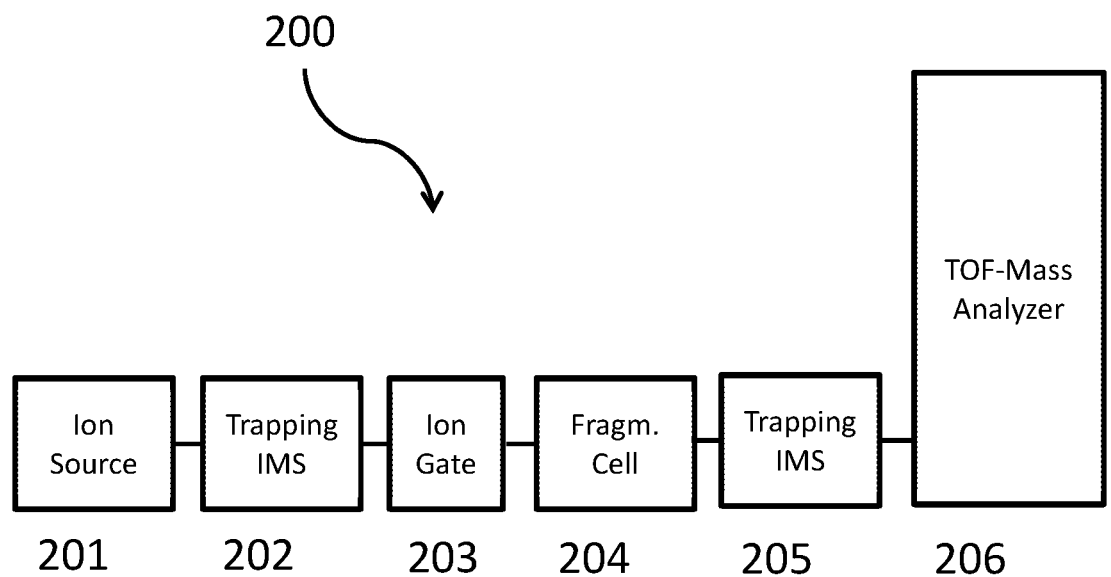
FIG. 3 shows an ion mobility spectrometer (200) according to the present invention which comprises an ion source (201), a TIMS analyzer (202) as first ion mobility analyzer, an ion gate (203), a fragmentation cell (204), a TIMS analyzer (205) as second ion mobility analyzer and a TOF mass analyzer (206) as ion detector.

Referring now to FIG. 3, an ion mobility spectrometer (200) according to the present invention is shown which comprises an ion source (201), a TIMS analyzer (202) as first ion mobility analyzer, an ion gate (203), a fragmentation cell (204), a TIMS analyzer (205) as second ion mobility analyzer and a TOF mass analyzer (206) as ion detector.

The ion source (201) is a sub-ambient electrospray (LP-ESI) ion source coupled to a syringe pump or a liquid chromatography system for supplying a sample (not shown). Ions generated in the LP-ESI source (201) are transferred to the first TIMS analyzer (202) and separated according to mobility in time by the first TIMS analyzer (202). The ion gate (203) is operated to temporally select ions of a limited mobility range from the separated ions. The ion gate can be an ion-optical einzel lens, a Tyndall gate or a Bradbury-Nielsen gate. The selected ions of the limited mobility range are then fragmented in a fragmentation cell (204). The ion gate (203) and the fragmentation cell (204) are separate devices and located between the first and the second TIMS analyzers (202, 205). The fragmented ions are transferred to the TIMS analyzer (205) where they are trapped and then separated according to mobility. The separated fragment ions are detected in a time-of-flight (TOF) mass analyzer (206), which preferably comprises means for orthogonal ion injection and a reflector. The ion mobility spectrometer (200) optionally comprises a mass filter and a second fragmentation cell (not shown) which are located between the second TIMS analyzer (205) and the TOF mass analyzer (206).

Figure 4A:
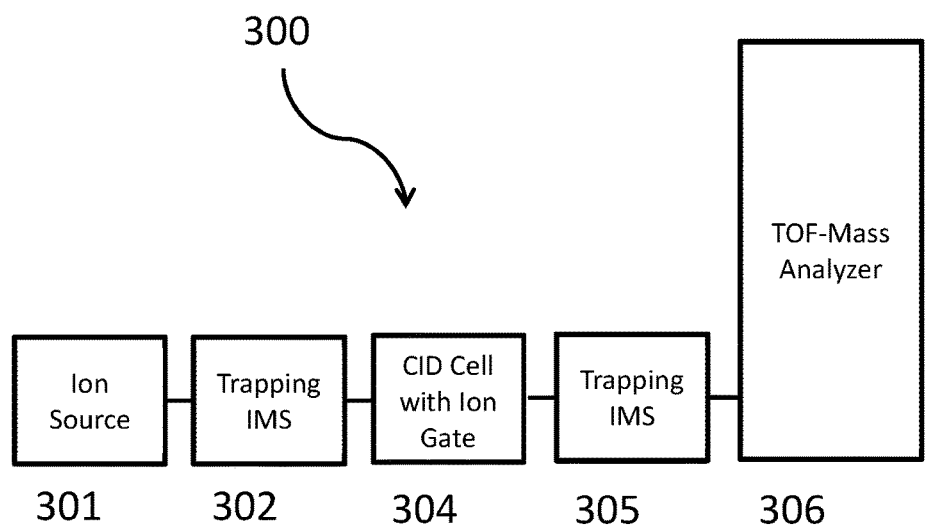
FIGS. 4A and 4B show an ion mobility spectrometer (300) according to the present invention which comprises an atmospheric pressure electrospray ion source (301), a TIMS analyzer (302) as first ion mobility analyzer, an CID cell (304) with integrated ion gate, a TIMS analyzer (305) as second ion mobility analyzer and a TOF mass analyzer (306) as ion detector.

Referring now to FIG. 4A, an ion mobility spectrometer (300) according to the present invention is shown which comprises an ambient pressure source (301) (AP-ESI), a first TIMS analyzer (302), an CID cell with an integrated ion gate (304), a second TIMS analyzer (305) and a TOF mass analyzer (306) as ion detector.

Figure 4B:
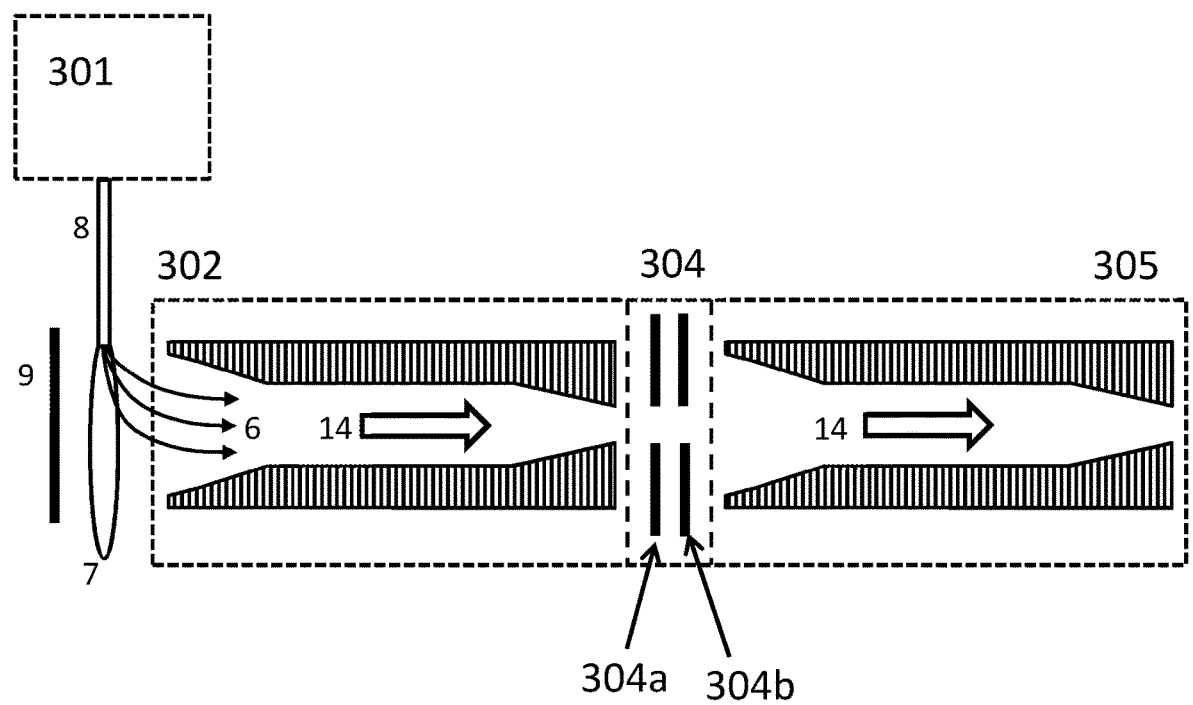

Referring now to FIG. 4B, the first TIMS analyzer (302), the CID cell with an integrated ion gate (304), and the second TIMS analyzer (305) are shown in more detail.

The AP-ESI source (301) is coupled to a syringe pump or a liquid chromatography system for supplying a sample (not shown). Ions are generated in the AP-ESI (301) and enter a first vacuum stage of the ion mobility spectrometer (300) through a transfer capillary (8). Ions (6) are deflected from the exit of the transfer capillary (8) into the ion funnel entrance of the first TIMS analyzer (302) where they are separated according to mobility in time.

The ion gate is an integral part of the CID cell (304) and comprises two annular electrodes (304a, 304b). It is operated to temporally select ions by applying attracting electric DC potentials to the annular electrodes (304a, 304b) during the selection interval and by applying repelling electric DC potentials to the annular electrodes (304a, 304b) outside the selection interval. The annular electrode (304b) is preferably positioned 2 mm after annular electrode (304a).

The selected ions of the limited mobility range are optionally accelerated in the gas filled region between the annular electrodes (304a, 304b) which results in collision induced dissociation of the selected ions. The fragmented ions are transferred to the second TIMS analyzer (305) where they are trapped and then separated according to mobility. The separated fragment ions are detected in a time-of-flight (TOF) mass analyzer (306), which preferably comprises means for orthogonal ion injection and a reflector. The ion mobility spectrometer (300) optionally comprises a mass filter and a second fragmentation cell (not shown) which are located between the second TIMS analyzer (305) and the TOF mass analyzer (306).

The TIMS analyzers (302, 305) share the same design. The TIMS analyzers (302, 305) comprise printed circuit boards (PCBs), starting with a diameter of 25.4 mm at the entrance and linearly tapering to an 8 mm diameter in the tunnel section having a length of 48 mm. Each electrode is segmented into quadrants.

A quadrupolar electric RF field is generated at each plate by applying two radio frequency phases shifted by 180 degrees, with the phase between adjacent PCBs also shifted by 180 degrees along the funnel entrance in order to create a dipolar electric field. A segmented quadrupolar electric RF field is generated along the tunnel section in which the TIMS analysis can take place. The PCBs of one TIMS analyzer (302, 305) are driven via a single RF generator, preferably running at 800-900 kHz and up to 350 Vpp. The settings of the frequency can be adjusted to the mass range of ions to be analyzed, in particular to macromolecular ions for applications in the field of structural biology. Each TIMS analyzer (302, 305) is driven by a separate RF generator to allow independent control of the electric RF fields.

An electric DC field barrier is created along each TIMS analyzer (302, 305) by resistively dividing the potential difference. The electric DC field barriers of each TIMS analyzer (302, 305) are independently adjustable by separate DC generators.

A rising edge of an electric DC field barrier is created in the first part of the tunnel section to trap ions with a broad range of mobilities while the second part of the tunnel section supports a plateau of the electric DC field barrier. The height of the electric DC field barrier within the tunnel is scanned during analysis by holding the exit of the tunnel section at a fixed electric DC potential while the electric DC potential at the entrance is changed with time.

The exit funnel of each TIMS analyzer (302, 305) starts with a diameter of 8 mm tapering to 4 mm over a total length of 11 mm. A quadrupolar electric RF field is generated at each plate in the same fashion as in the entrance funnel again with a 180 degree phase shift between PCBs. A DC electric field is created along the exit funnel and kept constant during analysis. The exit funnel of the first TIMS analyzer (302) serves to both collect and focus ions exiting the first TIMS analyzer (302) and provide a region to pump away the buffer gas used for analysis. The pressure in the entrance region of the TIMS analyzers (302, 305) is typically in the range of 100 to 400 Pa.

The TIMS analyzers (302, 305) are connected via the CID cell (304) which comprises two annular electrodes (304a, 304b). The electrodes (304a, 304b) enable both mobility-selective ion gating and collisional-activation of mobility-selected ions. The first electrode (304a) is located 1 mm from the last PCB of the exit funnel of first TIMS analyzer (302). The second electrode (304b) is positioned 2 mm after first electrode (304a) and 2 mm before the entrance funnel of the second TIMS analyzer (305). The pressure in the CID cell (304) is on the order of 100 to 300 Pa.

By timing electric DC potentials applied to the electrodes (304a, 304b) during a mobility scan of first TIMS analyzer (302), ions of a given mobility can either be transmitted by the application of (weakly) accelerating electric fields or blocked via repulsive electric fields. As the electrodes (304a, 304b) comprise a small diameter and are located close to each another, potential differences of only 10 V (50 V/cm) can be sufficient to completely block ions. Such low electric potentials, and the relatively low capacitance of the apertures themselves, allow switching times of less than 100 µsec.

With the application of no or slightly accelerating electric DC fields, ions are transmitted through the CID cell (304) into the second TIMS analyzer (305) with no or little collisional activation. The transmitted ions can be collisionally activated and dissociated in the CID cell (304) by accelerating them in sufficiently high electric DC fields between the electrodes (304a) and 304(b). If desired, electric DC fields up to about 800 V/cm can be generated between the electrodes (304a) and (304b).

The arrangement of the CID cell with an integrated ion gate (304) between the TIMS analyzers (302, 305) allows different modes of operation. The TIMS analyzers (302, 305) can be operated independently from each other to (1) transmit ions without mobility separation; (2) separate ions based on their mobility; and (3) trap ions for a specified time interval immediately prior to mobility-analysis. The CID cell with an integrated ion gate (304) between the TIMS analyzers (302, 305) allows four modes of operation: (1) transmission; (2) mobility-selection; (3) collisional-activation; and (4) mobility-selection combined with collisional-activation of ions. These modes of operation can be combined to generate a number of different operational modes. Additionally, the mass spectrometer system has the capability to perform tandem MS analysis.

Figure 5A:
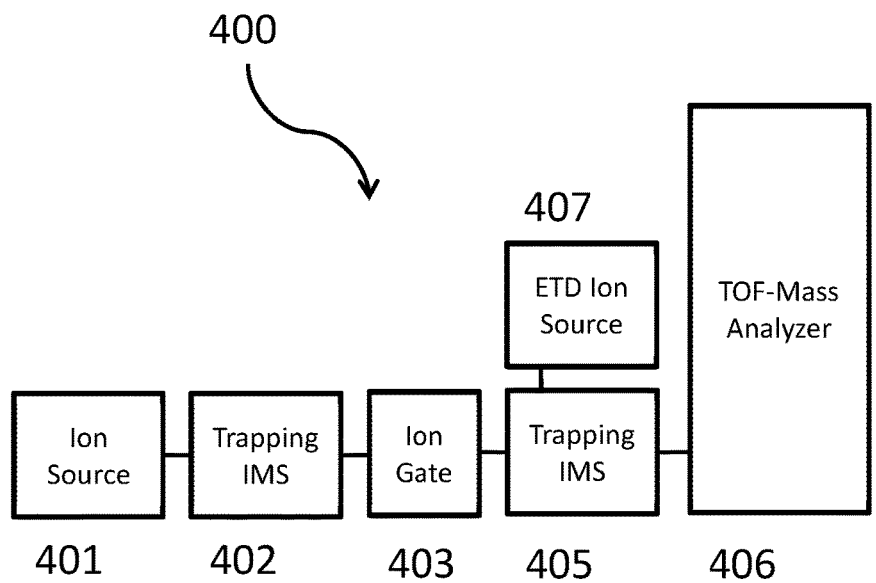
FIGS. 5A and 5B show an ion mobility spectrometer (400) according to the present invention which comprises an atmospheric pressure electrospray ion source (401), a TIMS analyzer (402) as first ion mobility analyzer, an ion gate (403), a TIMS analyzer (405) as second ion mobility analyzer, a ETD ion source (407) coupled to the second TIMS analyzer (405) and a TOF mass analyzer (406) as ion detector.

Referring now to FIG. 5A, an ion mobility spectrometer (400) according to the present invention is shown which comprises an ambient pressure electrospray ion source (401) (AP-ESI source), a first TIMS analyzer (402), an ion gate (403), a second TIMS analyzer (405), an ETD ion source (407) coupled to the second TIMS analyzer (405) and a TOF mass analyzer (406) as ion detector.

Figure 5B:
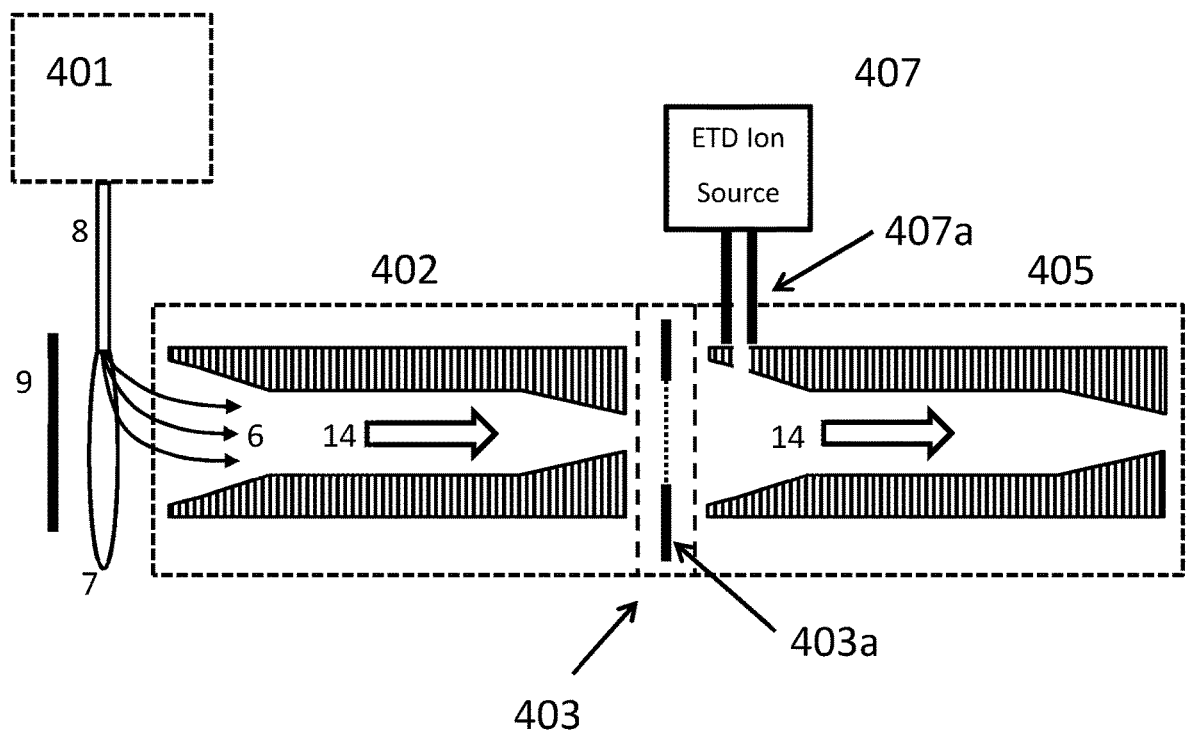

Referring now to FIG. 5B, the first TIMS analyzer (402), the ion gate (403), the ETD ion source (407) and the second TIMS analyzer (405) are shown in more detail.

The AP-ESI source (401) is coupled to a syringe pump or a liquid chromatography system for supplying a sample (not shown). Ions generated in the AP-ESI source (401) are transferred to the first TIMS analyzer (402) and separated according to mobility in time by the first TIMS analyzer (402).

The ion gate (403) comprises a Bradbury-Nielson shutter (403a) which is located between the TIMS analyzers (402, 405). It is operated to temporally select ions by switching DC potentials applied to interleaved wires of the Bradbury-Nielson shutter (403a) during the selection interval. The selected ions of the limited mobility range are transferred to the second TIMS analyzer (405) where they are trapped.

During trapping, negatively charged ETD reactant ions are transferred from the ETD ion source (407) to the entrance region of the second TIMS analyzer (405). The ETD reactant ions are generated in the ETD ion source (407) by negative chemical ionization, and are guided via a small ion guide (407a) to an ion switch, where they are threaded into the second TIMS analyzer (405). The negative ETD reactant ions pass through the second TIMS analyzer (405) and react inside the second TIMS analyzer (405) with the selected positive ions which are preferably pushed by a downstream gas flow (14) against a rising edge of an electric DC field and trapped at mobility dependent positions along the rising edge. The fragment ions are also trapped in the second TIMS analyzer (405) prior to the mobility separation. The separated fragment ions are detected in a time-of-flight (TOF) mass analyzer (406), which preferably comprises means for orthogonal ion injection and a reflector. The ion mobility spectrometer (400) optionally comprises a mass filter and a second fragmentation cell (not shown) which are located between the second TIMS analyzer (405) and the TOF mass analyzer (406).

Figure 6A:
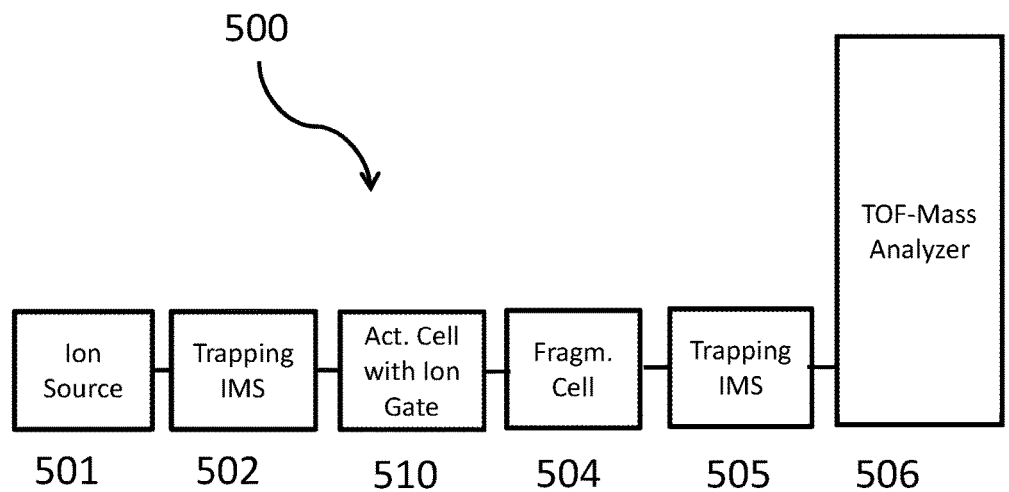
FIGS. 6A and 6B show an ion mobility spectrometer (500) according to the present invention which comprises an atmospheric pressure electrospray ion source (501), a TIMS analyzer (502) as first ion mobility analyzer, a collision induced activation cell with an integrated ion gate (510) (CIA cell), a CID cell (504), a TIMS analyzer (505) as second ion mobility analyzer and a TOF mass analyzer (506) as ion detector.

Referring now to FIG. 6A, an ion mobility spectrometer (500) according to the present invention is shown which comprises an ambient pressure electrospray ion source (501) (AP-ESI source), a TIMS analyzer (502) as first ion mobility analyzer, a collision induced activation cell with integrated ion gate (510), a CID cell (504), a TIMS analyzer (505) as second ion mobility analyzer and a TOF mass analyzer (506) as ion detector.

Figure 6B:
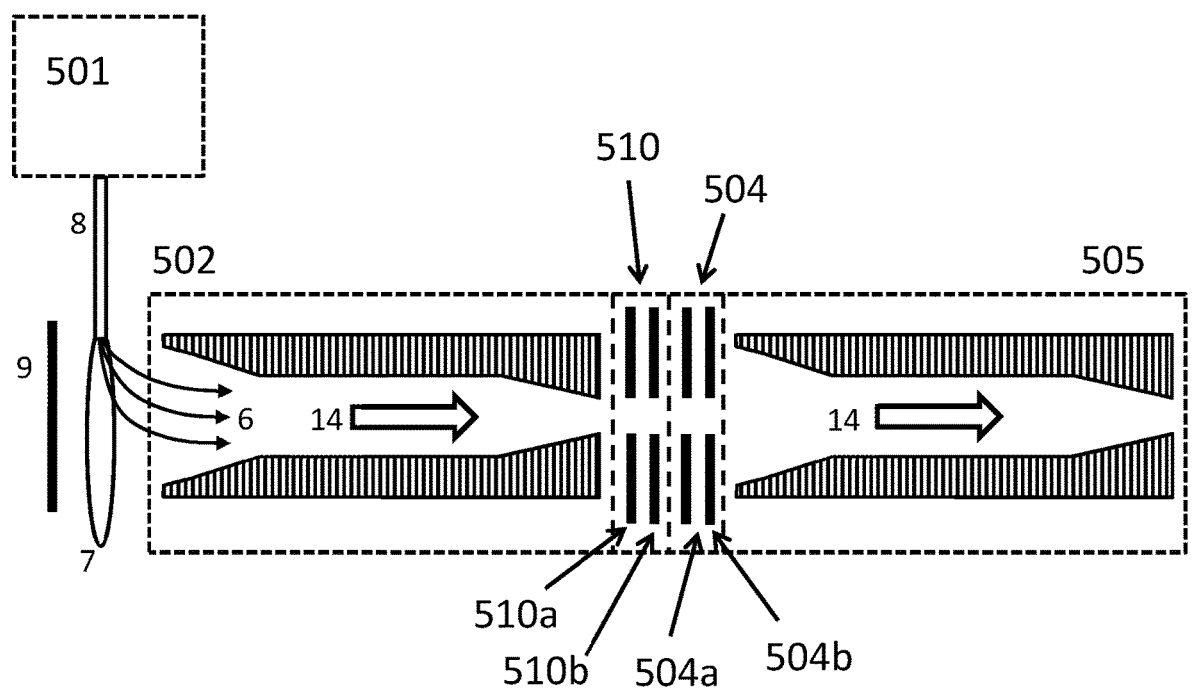

Referring now to FIG. 6B, the first TIMS analyzer (502), the collision induced activation cell with integrated ion gate (510), the CID cell (504) and the second TIMS analyzer (505) are shown in more detail.

The ion mobility spectrometer (500) differs from the ion mobility spectrometer (300) shown in FIGS. 4A and 4B in that the ion gate (510) is integrated in a cell for collision induced activation, rather than in a cell for collision induced dissociation. Here, the CID cell (504) is separated from the ion gate (510). The ion gate (510) comprises two annular electrodes (510a, 510b). It is operated to temporally select ions by applying attracting electric DC potentials to the annular electrodes (510a, 510b) during the selection interval and by applying repelling electric DC potentials to the annular electrodes (510a, 510b) outside the selection interval.

The attracting electric DC potentials between the annular electrodes (510a, 510b) can be less than 20 V for selecting the ions. The applied potentials can be further increased to accelerate the selected ions in the gas filled region between the annular electrodes (510a, 510b) to induce collision induced activation, but not fragmentation. The accelerating potential for activation may be between 20V and 100V.

The selected and optionally activated ions are further accelerated in the gas filled region between the annular electrodes (504a, 504b) of the CID cell (504) which results in collision induced dissociation of the selected ions. The fragmented ions are transferred to the second TIMS analyzer (505) where they are trapped and then separated according to mobility. The separated fragment ions are detected in a time-of-flight (TOF) mass analyzer (506), which preferably comprises means for orthogonal ion injection and a reflector. The ion mobility spectrometer (500) optionally comprises a mass filter and a second fragmentation cell (not shown) which are located between the second TIMS analyzer (505) and the TOF mass analyzer (506).

The accelerating voltages of the ion gate (510) and the CID cell (504) can be adjusted in accordance to the ions or compound class to be analyzed. They can be varied independently such that the mobility of fragment ions can be determined as a function of both activation and fragmentation energy. Furthermore, the trapping time in the second TIMS analyzer (505) can be varied such that the change of mobility of the fragment ions and thus conformational changes can also be determined as a function of time.

Figure 7A:
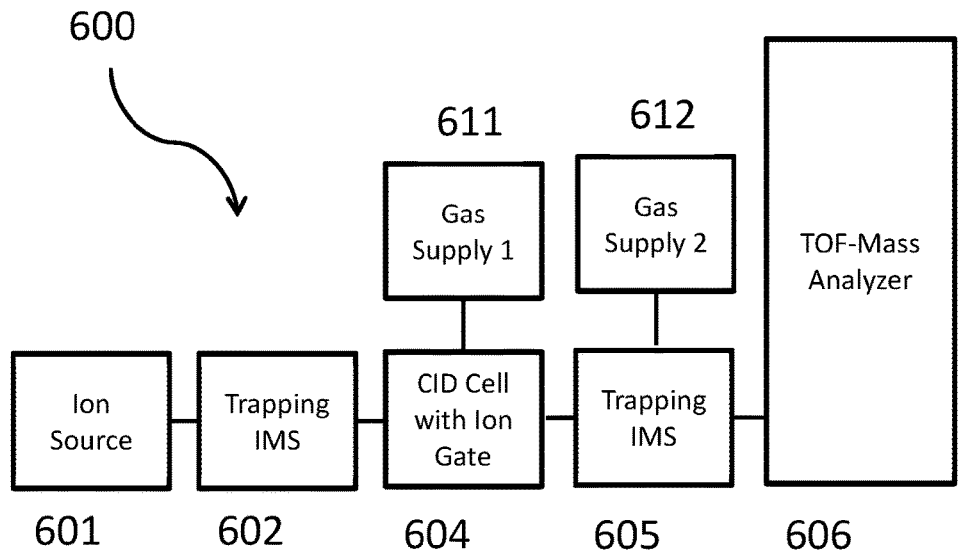
FIGS. 7A and 7B shows an ion mobility spectrometer (600) according to the present invention which comprises an ambient electrospray ion source (601) (AP-ESI), a TIMS analyzer (602) as first ion mobility analyzer, a CID cell with integrated ion gate (604), a first gas supply (611), a TIMS analyzer (605) as second ion mobility analyzer, a second gas supply (612) and a TOF mass analyzer (606) as ion detector.

Referring now to FIG. 7A, an ion mobility spectrometer (600) according to the present invention is shown which comprises an ambient electrospray ion source (601) (AP-ESI), a TIMS analyzer (602) as first ion mobility analyzer, a CID cell with integrated ion gate (604), a first gas supply (611), a TIMS analyzer (605) as second ion mobility analyzer, a second gas supply (612) and a TOF mass analyzer (606) as ion detector.

Figure 7B:
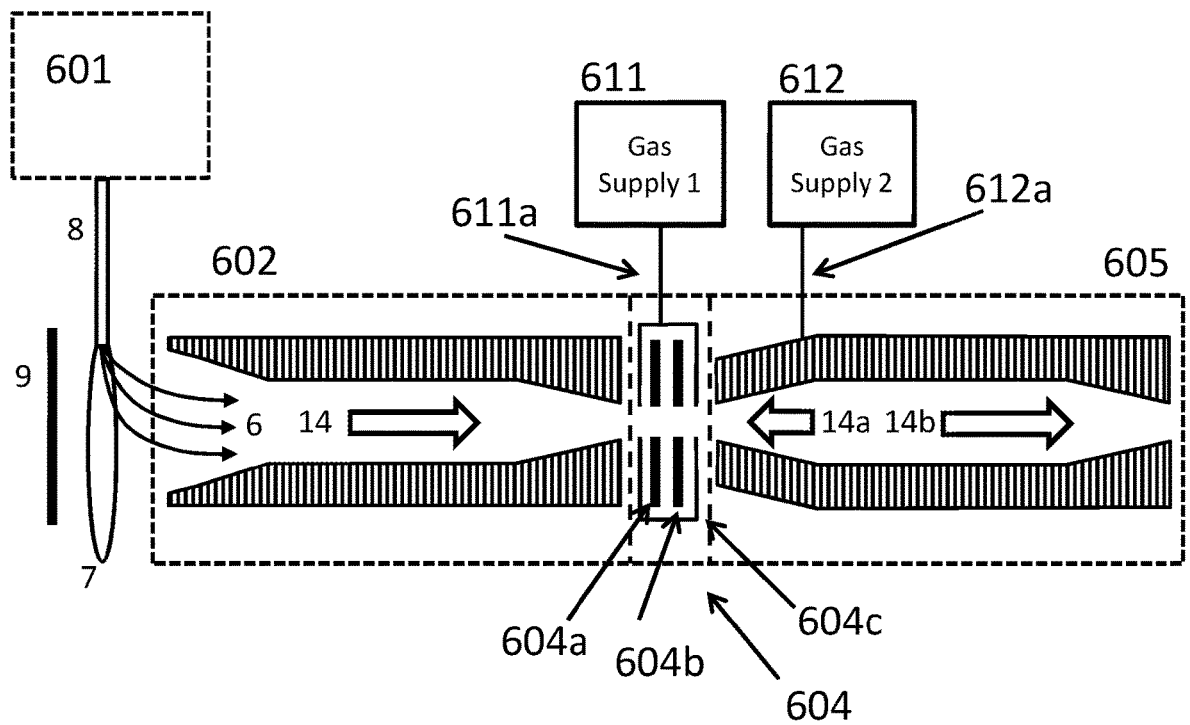

Referring now to FIG. 7B, the AP-ESI source (601), the first TIMS analyzer (602), the ion gate (604) with the connected first gas supply (611) and the second TIMS analyzer (605) with the connected second gas supply (612) are shown in more detail.

The ion mobility spectrometer (600) is similar to the ion mobility spectrometer (300) shown in FIGS. 4A and 4B with respect to the AP-ESI source (601) and the CID cell with integrated ion gate (604) which is positioned between two TIMS analyzers (602, 605). The ion gate (604) is used to select ions of at least one limited mobility range and to accelerate them in a gas filled region between annular electrodes (604a, 604b) to induce collision induced dissociation.

A first difference between the ion mobility spectrometers (300) and (600) is that the CID cell with integrated ion gate (604) comprises a housing (604c) which is connected via a feed (611a) with the first gas supply (611). The first gas supply (611) delivers an additional gas component to the gas filled region between the annular electrodes (604a, 604b) of the ion gate (604). Preferably, the gas component has higher atomic mass than nitrogen (28. Da) which is commonly used as flowing buffer gas (14) in the first TIMS analyzer (602) and introduced from the AP-ESI source (601) through the transfer capillary (8). The flowing buffer gas (14) can easily comprise vapor of water and/or organic solvents sprayed in the AP-ESI source (601). The additionally supplied gas component can for example be argon, carbon dioxide or sulfur hexafluoride. A high atomic mass of the collision gas atoms/molecules used for CID enhances the fragmentation efficiency, in particular for macromolecules.

A second difference between the ion mobility spectrometers (300) and (600) is that the entrance region of the second TIMS analyzer is connected to the second gas supply (612) which delivers the buffer gas (14a, 14b) to the second TIMS analyzer (605) via feed (612a). The entrance region of the second TIMS analyzer (605) is inversely formed and tapers towards the entrance. The region between the first and second TIMS analyzer (602, 605) is connected to a pump (not shown) such that the pressure in this region is lower than inside the second TIMS analyzer (605) which results in a minor gas flow (14a) from inside the second TIMS analyzer (605) towards its entrance. The selected ions can be transferred into the second TIMS analyzer (605) by an axial electric DC field against the gas flow (14a). The major gas flow (14b) is directed downstream towards the exit and is used to push the selected ions against the rising edge of the electric DC field barrier of the second TIMS analyzer (605). The two TIMS analyzers (602, 605) are decoupled with regard to the gas flows. This is advantageous because it allows to use different gases in the TIMS analyzers (602, 605), to control the pressure and velocity independently and to enhance the purity of the buffer gas of the second TIMS analyzer (605). In particular, the vapor introduced from the AP-ESI source (601) is reduced or even completely eliminated in the second TIMS analyzer (605) such that the mobility of the fragment ions can be determined more accurately in a well-defined buffer gas.

Figure 8A:
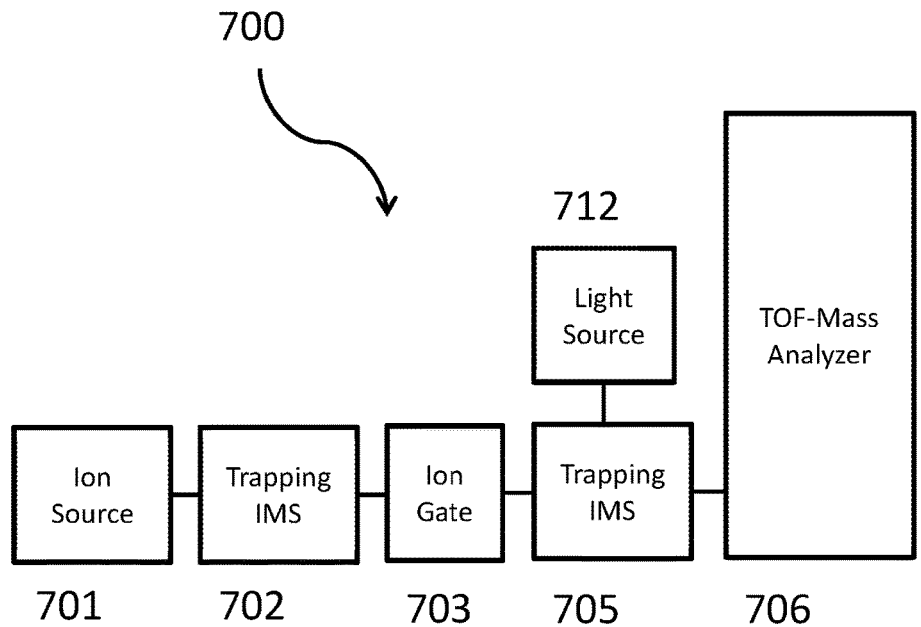
FIGS. 8A to 8D show an ion mobility spectrometer (700) according to the present invention which comprises a low-pressure MALDI ion source (701), a TIMS analyzer (702) as first ion mobility analyzer, an ion gate (703), a light source (712), a TIMS analyzer (705) as second ion mobility analyzer and a TOF mass analyzer (706) as ion detector.

Referring now to FIG. 8A, an ion mobility spectrometer (700) according to the present invention is shown which comprises a low-pressure MALDI ion source (701), a TIMS analyzer (702) as first ion mobility analyzer, an ion gate (703), a light source (712), a TIMS analyzer (705) as second ion mobility analyzer and a TOF mass analyzer (706) as ion detector.

Figure 8B:
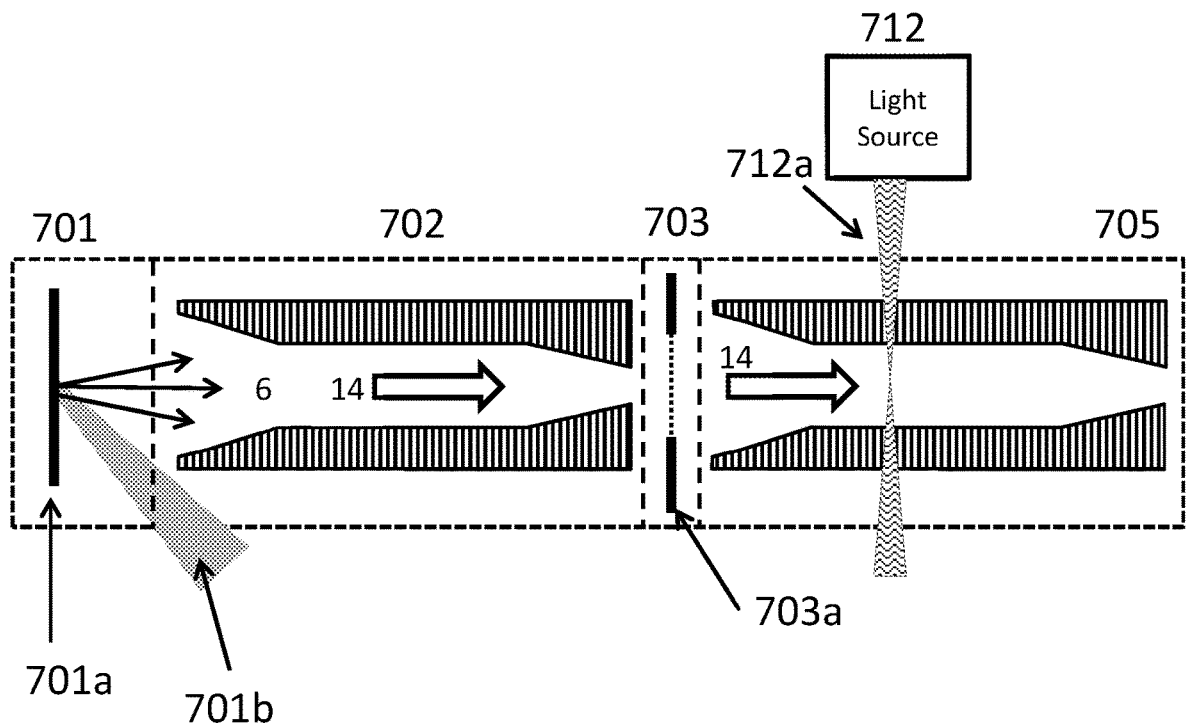
Figure 8C:
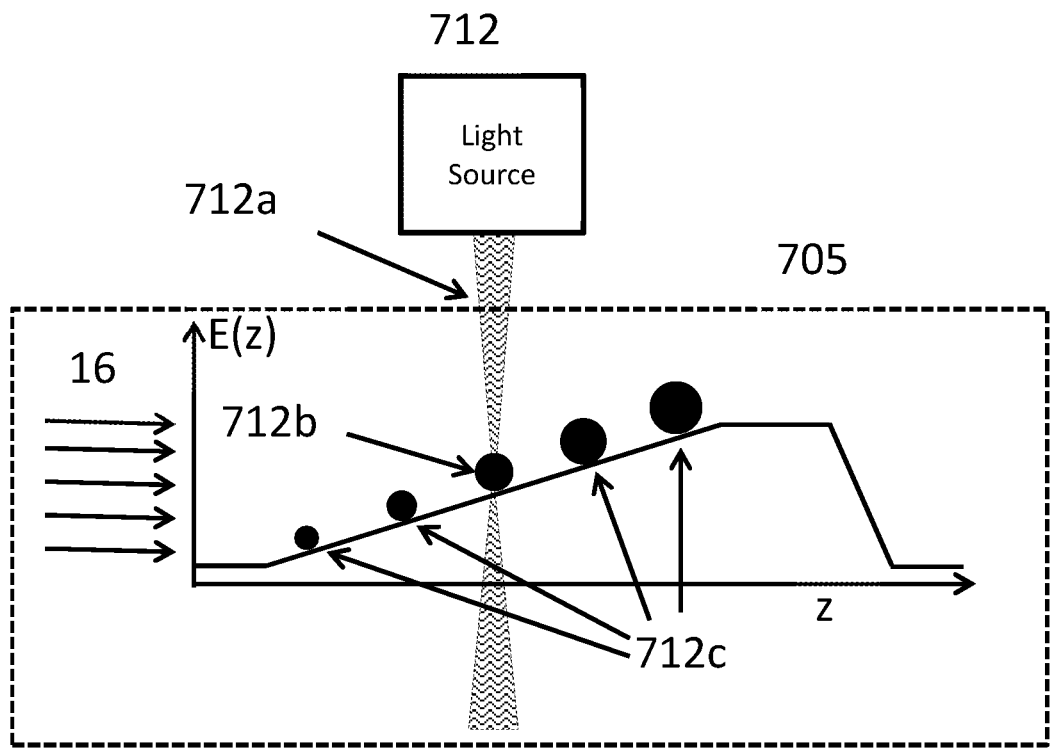
Figure 8D:
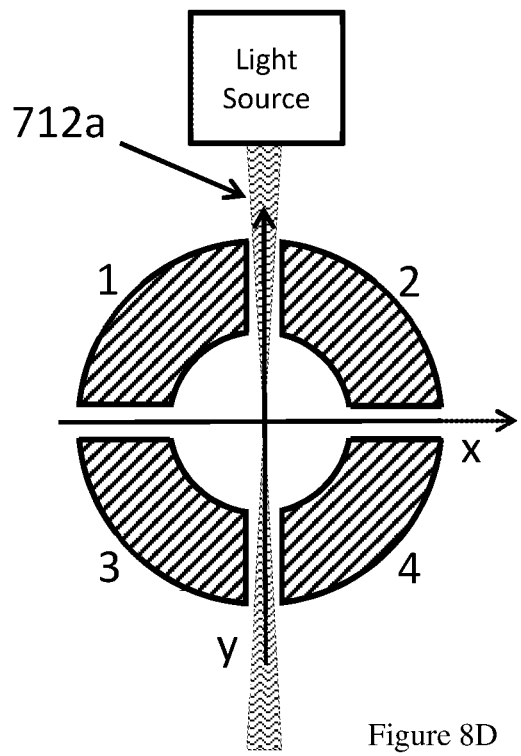

Referring now to FIGS. 8B to 8D, the MALDI source (701), the first TIMS analyzer (702), the ion gate (703), the second TIMS analyzer (705) and the light source (712) are shown in more detail.

Ions (6) are generated in a low pressure MALDI ion source (701). A MALDI sample plate (701a) is placed near the entrance of the first TIMS analyzer (702). A UV laser pulse (701b) is focused on a sample position on the MALDI sample plate (701a) for generating the ions (6) by matrix assisted laser desorption/ionization. The pressure at the MALDI sample plate (701a) is about a few hundred Pascal.

The ions (6) generated in multiple laser shots are trapped in the first TIMS analyzer (702) and then separated according to mobility in time by the first TIMS analyzer (702). Ions of at least one limited mobility range are selected by adjusting the transmission of the ion gate (703). The ion gate (703) comprises a Bradbury-Nielson shutter (703a) and is operated to temporally select ions by switching DC potentials applied to interleaved wires of the Bradbury-Nielson shutter (703a) during the selection interval. The selected ions (712b) of the at least one limited mobility range are transferred to the second TIMS analyzer (705) where they are trapped at the rising edge of the second TIMS analyzer (705) (see FIG. 8C).

The selected and trapped ions (712b) are irradiated by light (712a) from a light source (712) wherein the light path is introduced orthogonally onto the z-axis of the second TIMS analyzer (705) (see FIGS. 8B and 8D). The fragment ions (712c) are produced by photo-dissociation and trapped together with remaining precursor ions (712b) at the rising edge of the second TIMS analyzer (705) (see FIG. 8C). It has to be noted that the mobility of the fragment ions (712c) can be higher or lower than the mobility of the precursor ions (712b) as can be seen in FIG. 8C. The orthogonal focusing has the advantage that essentially only the precursor ions are fragmented by photo-dissociation. However, it is also possible but less advantageous to introduce light along the axis of a TIMS analyzer.

The light (712a) is orthogonally introduced through a small window or slit between the two segmented quadrants (1, 2) of one or more TIMS electrodes and preferably also exits through a small window or slit between the two segmented quadrants (3, 4) of one or more TIMS electrodes (see FIG. 8D).

The light source (712) can be an inexpensive infrared laser diode and the selected precursor ions (712b) are fragmented by infrared multiple photon-dissociation (IRMPD). Alternatively, the light source (712) can be a solid state laser system, e.g. a diode pumped Nd:YAG, of the MALDI source (701) that produces ultraviolet laser pulses for the MALDI process, but can also deliver pulsed infrared light and continuous infrared laser light. The pulsed infrared light can be a portion of the fundamental wavelength generated inside the solid state laser system. The continuous infrared laser light can be a portion of the light of an infrared laser diode used to pump the laser medium. In this case, the selected precursor ions (712b) can be fragmented by ultraviolet photo-dissociation (UVPD) or multiple photon-dissociation (IRMPD). Both kinds of fragmentation techniques give different and often complementary fragmentation patterns.

The ion mobility spectrometer (700) can also be used according to the second aspect of the invention. The selected ions (712b) are trapped at the rising edge of the electric DC field barrier of the second TIMS (705) and then activated without fragmentation. The activated ions are separated according to mobility, for example by lowering the height of the electric DC barrier. The activation energy as well as the trapping time can be varied to determine the mobility of the activated ions as a function of time and/or activation energy.

Referring now to FIGS. 9A to 9E, experimental data for ubiquitin 8+ acquired with the ion mobility spectrometer (300) is shown demonstrating the ability to dissociate intact proteins into fragment ions between the two TIMS analyzers (302, 305) by collision-induced dissociation (CID).

Figure 9A:
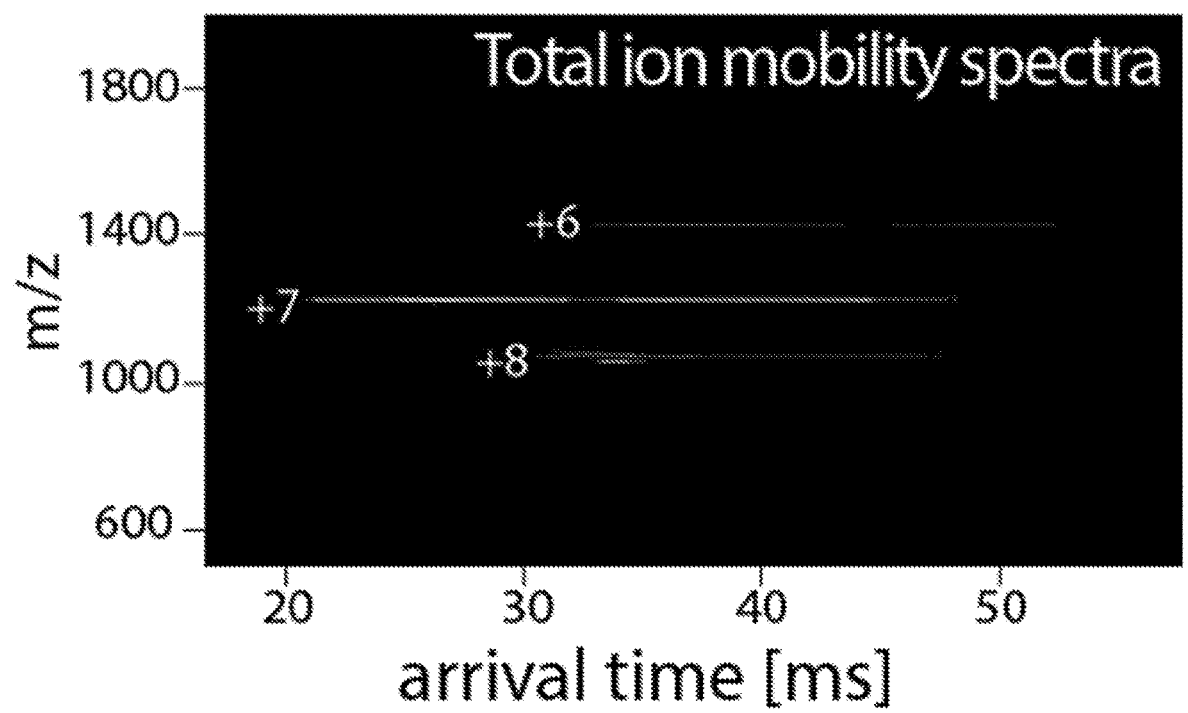
FIGS. 9A to 9E show experimental data for ubiquitin 8+ acquired with the ion mobility spectrometer (300) shown in FIGS. 4A and 4B.

Referring now to FIG. 9A, ubiquitin ions are generated in the ambient electrospray ion source (301) and transferred to the second TIMS analyzer (305) without separation in the first TIMS analyzer (302). FIG. 9A shows nested IMS-MS spectra for ubiquitin ions without selection and fragmentation. The arrival time is the time when ions arrive at the TOF mass analyzer (306) after starting the scan of the electric DC barrier of the second TIMS analyzer (305). The arrival time corresponds to the ion mobility and, in TIMS, ions with lower mobility exhibit shorter arrival times which is opposite to TW-IMS and drift type IMS.

Figure 9B:
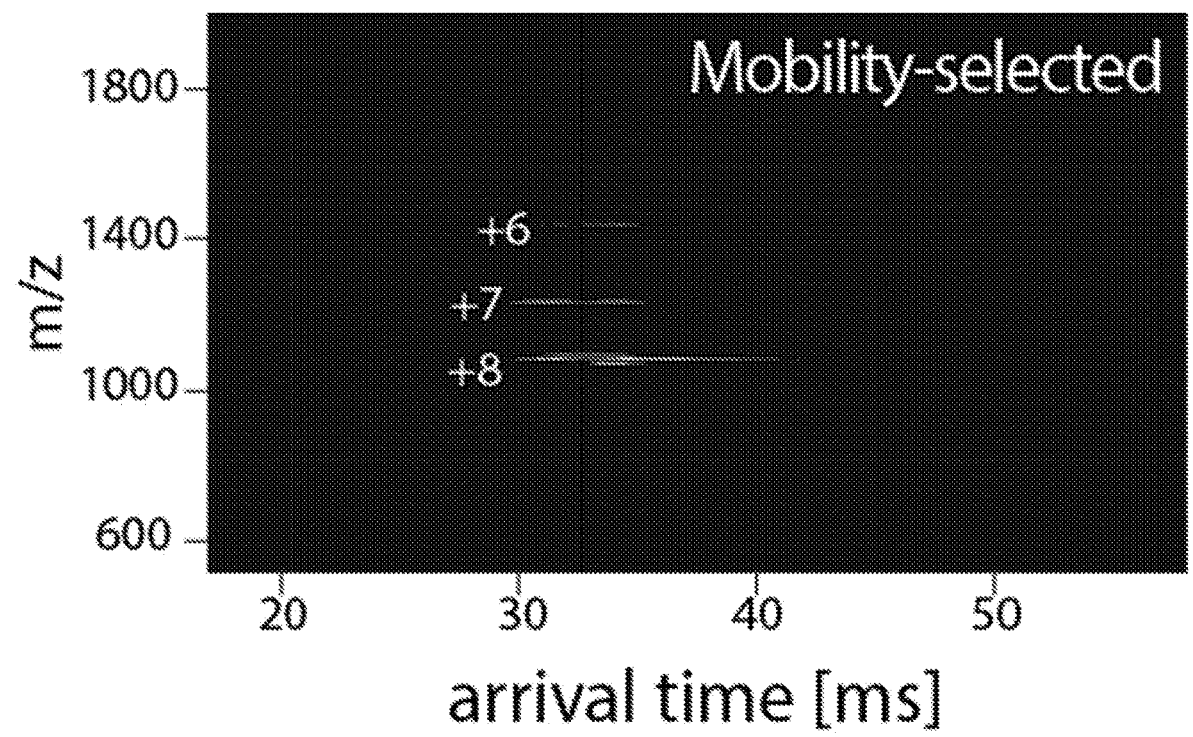

Referring now to FIG. 9B, ubiquitin ions are generated in the AP-ESI ion source (301), transferred to the first TIMS analyzer (302) and separated according to mobility by the first TIMS analyzer (302). Ubiquitin +8 ions are selected by the ion gate (304) and trapped in the second TIMS analyzer (305) for a subsequent mobility separation in the second TIMS (305). FIG. 9B shows nested IMS-MS spectra for the selected ubiquitin +8 ions without fragmentation. Only minor abundances of ubiquitin +5 to ubiquitin +7 ions are visible in the nested IMS-MS spectra. These charge states can optionally be filtered out by a high-pass mass filter or band-pass mass filter between the first TIMS analyzer (302) and the ion gate (304).

Figure 9C:
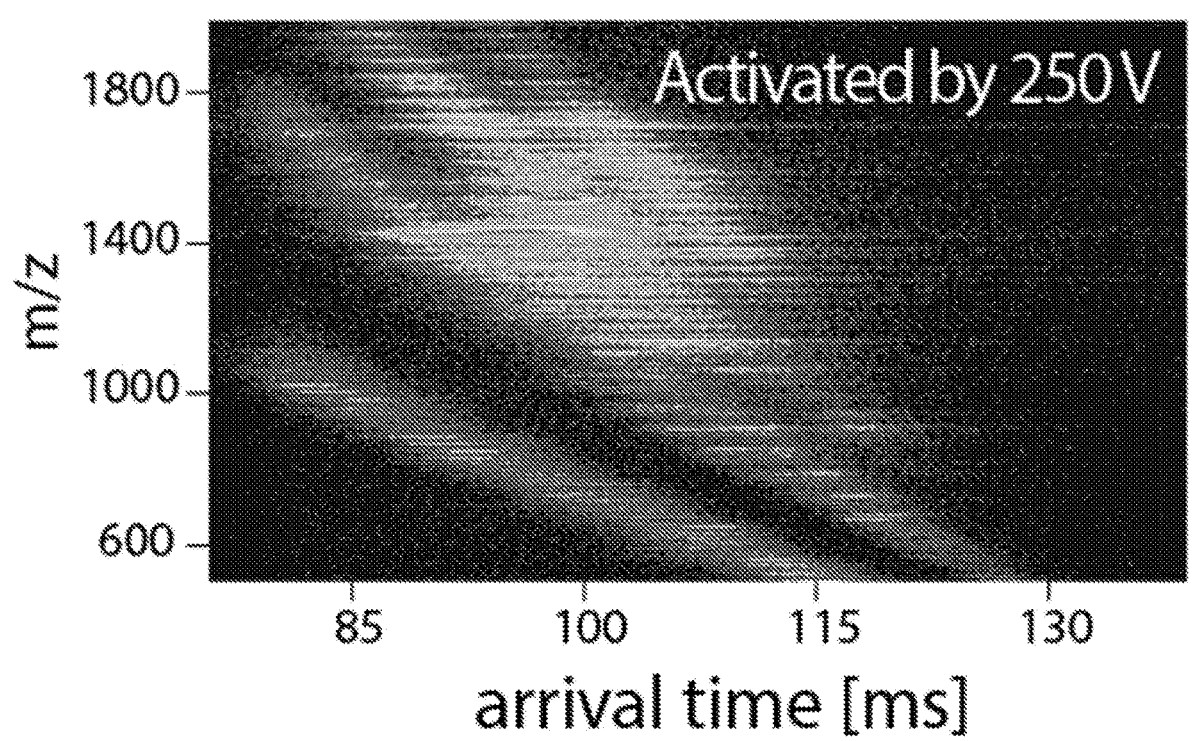

Referring now to FIG. 9C, ubiquitin ions are generated in the AP-ESI ion source (301), transferred to the first TIMS analyzer (302) and separated according to mobility by the first TIMS analyzer (302). Ubiquitin +8 ions are selected by the ion gate (304) and accelerated by applying an accelerating voltage of 250 V between the annular electrodes (304a) and (304b). The fragment ions resulting from collision induced dissociation are trapped in the second TIMS analyzer (305). FIG. 9C shows nested IMS-MS spectra for the fragment ions of the selected ubiquitin +8 ions.

Figure 9D:
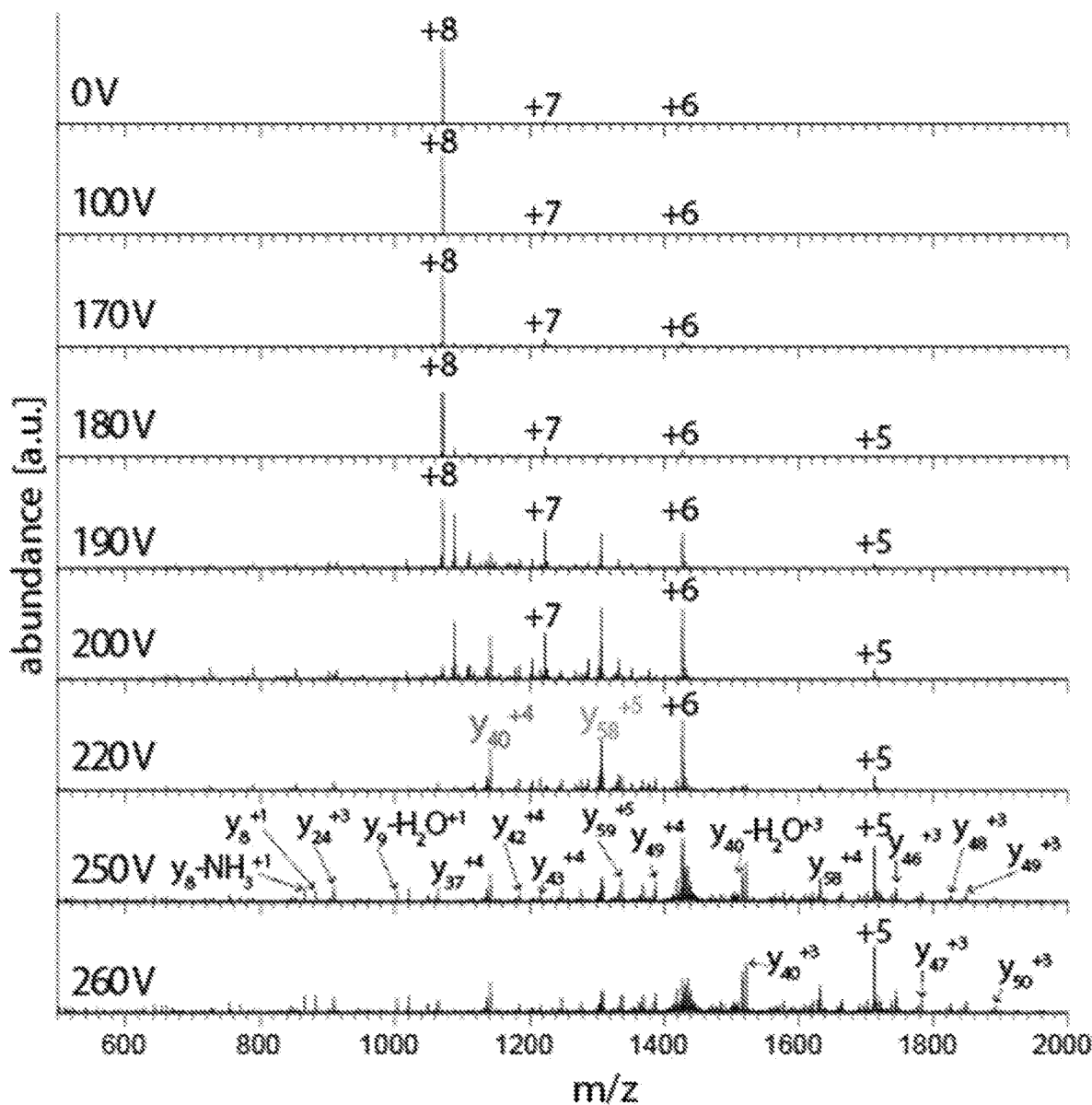

Referring now to FIG. 9D, mass spectra are shown which are obtained from mobility-selection of ubiquitin +8 ions followed by collisional-activation of the ubiquitin +8 ions in the ion gate (304) with acceleration voltages between 100 V and 260 V. Dissociation of precursor ions is observed for acceleration voltage greater than 170 V, with abundant formation of fragment ions and near depletion of the precursor ions as the acceleration voltage is increased to 260 V. Extensive formation of $y_{58}^{+5}$ and $y_{40}^{+4}$ fragment ions is observed with activation voltage >180 V, resulting from cleavage N-terminal to Pro19 and Pro37. The decrease in abundance of the precursor ions correlates with emergence of fragment ions while charge-stripping processes appear insignificant. The mass spectra show significant sequence coverage at acceleration voltages above 200 V, with mostly b and y-type ions including their $H_2O$ and $NH_3$-loss ions, and prove that CID of an intact protein at low charge state is possible in an elevated pressure regime of about 100 Pa.

Figure 9E:
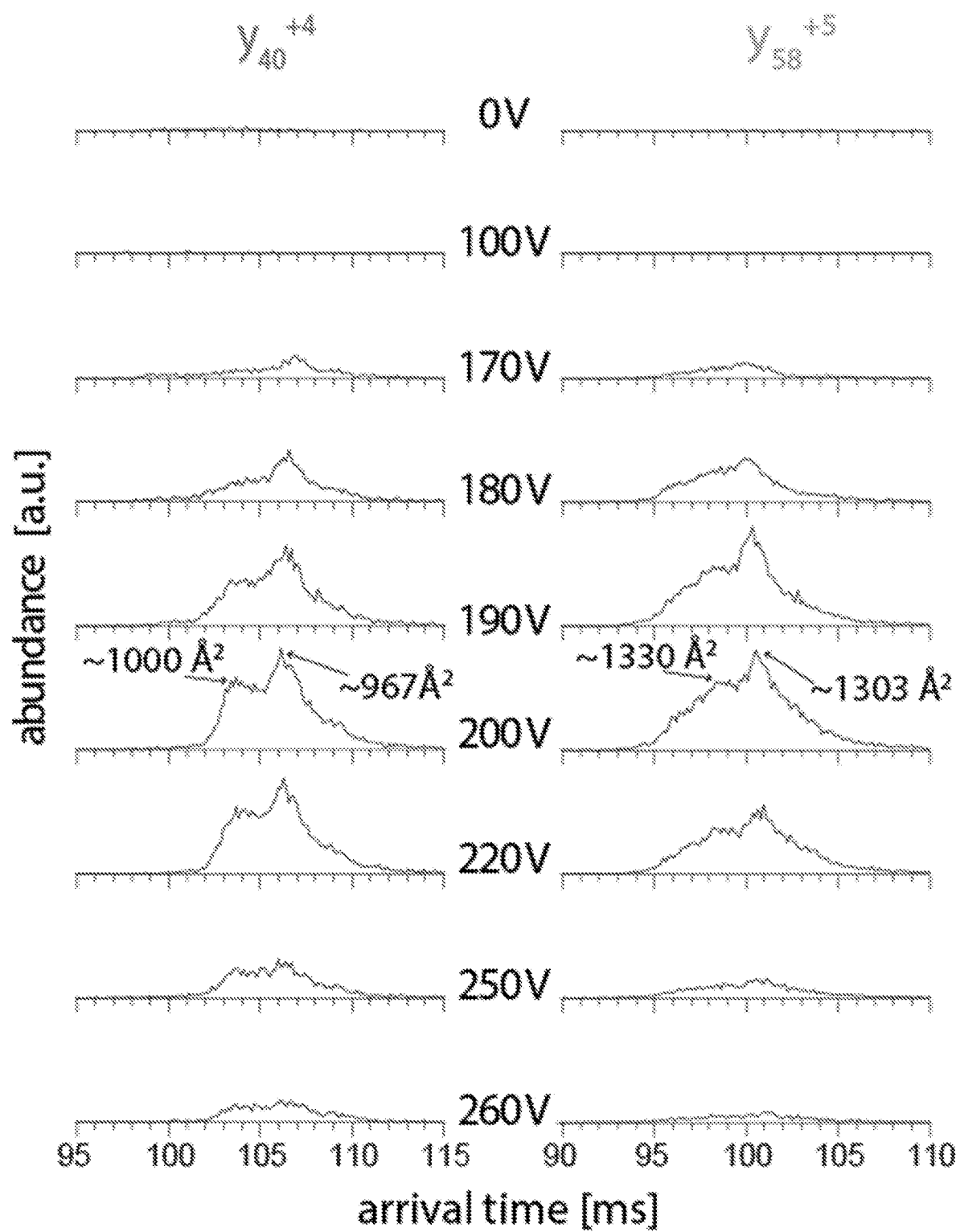

Referring now to FIG. 9E, mobility spectra are shown which are obtained for the $y_{58}^{+5}$ and $y_{40}^{+4}$ fragment ions as a function of acceleration voltage. The data show that both fragment ions exist in two distinct conformations. This indicates that fragment ions produced from protein ions may not generally be annealed to the most stable gas phase conformation. A rise in abundances of the larger conformations is observed when the acceleration voltage is increased to between 190 V and 200 V. This suggests that two protein fragmentation pathways might exist with different activation energies and/or activation entropies.

The fragmentation of full length protein ions in a tandem mobility spectrometer according to the present invention, in particular a tandem TIMS, enables middle-down, or potentially even top-down, proteomics experiments in which specific proteoforms are mobility-selected and fragmented, followed by mobility-analysis of their fragment ions. One can also expect that tandem mobility spectrometery according to the present invention allows analysis of complex polysaccharides, such as the glycosaminoglycans heparan or chondroitin sulfate. Studying protein fragmentation pathways, by monitoring the multiple conformations in fragment ions provides additional restraints on the precursor structure. A proposed structure for the (protein) precursor ion must also predict the various cross sections observed for all fragment ions, which would accommodate the IMS-based structure elucidation.

The invention claimed is:

1. A method for analyzing ions comprising:
    providing ions from an ion source to a first ion mobility analyzer,
    separating the ions according to mobility in the first ion mobility analyzer;
    selecting precursor ions of at least one limited mobility range;
    fragmenting the selected precursor ions into fragment ions;
    trapping the fragment ions in a second ion mobility analyzer, wherein the second ion mobility analyzer is a trapped ion mobility spectrometry (TIMS) analyzer;
    separating the fragment ions according to mobility in the second ion mobility analyzer; and
    detecting the separated fragment ions.

2. The method according to claim 1, wherein steps of separating in the first ion mobility analyzer, selecting and fragmenting are repeated while the second ion mobility analyzer is operated to accumulate the repeatedly fragmented ions prior to separating them according to mobility.

3. The method according to claim 1, wherein the selected ions are fragmented between the first and the second ion mobility analyzer.

4. The method according to claim 3, wherein the selected ions are fragmented by collision induced dissociation which results from accelerating the selected ions in or into a gas filled region by applying electric DC potentials to at least two annular electrodes which are located between the first and the second ion mobility analyzer.

5. The method according to claim 1, wherein the selected ions are fragmented inside the second ion mobility analyzer.

6. The method according to claim 5, wherein the selected ions are pushed by a gas flow against a rising edge of an electric DC field barrier of the second ion mobility analyzer and photons are introduced at the rising edge for inducing photo-dissociation of the selected ions in the second ion mobility analyzer.

7. The method according to claim 5, wherein the selected ions are pushed by a gas flow against a rising edge of an electric DC field barrier of the second ion mobility analyzer and ETD reactant ions or highly excited or radical neutral particles are introduced upstream of the rising edge for inducing electron transfer dissociation of the selected ions in the second ion mobility analyzer or fragmentation of the selected ions by reactions with the highly excited or radical neutrals in the second ion mobility analyzer.

8. The method according to claim 1, wherein the ions are separated according to mobility in time in the first ion mobility analyzer and the ions of the limited mobility range are selected by adjusting the transmission of an ion gate which is located between the first and the second ion mobility analyzer.

9. The method according to claim 1, wherein the ions are trapped and separated according to mobility in space in the first ion mobility analyzer, said first ion mobility analyzer being a trapped ion mobility spectrometry (TIMS) analyzer, and the ions of the limited mobility range is selected by adjusting an instrumental parameter of the first ion mobility analyzer or by changing the mobility of ions of the limited mobility range such that the ions of the limited mobility range leave the first ion mobility analyzer while other trapped ions stay trapped in the first ion mobility analyzer.

10. The method according to claim 1, wherein the trapping time of the selected ions prior to fragmentation is varied in subsequent measurements in order to determine the mobility of fragment ions as a function of time.

11. The method according to claim 1, wherein the selected ions are activated prior to the fragmentation and/or the fragment ions are activated prior to the separation in the second mobility analyzer.

12. The method according to claim 11, wherein activation energy introduced into the selected ions and/or fragment ions is varied in order to determine the mobility of the fragment ions as a function of the activation energy.

13. The method according to claim 1, wherein the fragment ions are further analyzed by acquiring mass spectra or acquiring fragment mass spectra.

14. A method for analyzing ions comprising:
    providing ions from an ion source to a first ion mobility analyzer,
    separating the ions according to mobility in the first ion mobility analyzer;
    selecting ions of a limited mobility range;
    activating or reacting the selected ions;
    trapping the activated or reacted ions in a second ion mobility analyzer wherein the second ion mobility analyzer is a trapped ion mobility spectrometry (TIMS) analyzer;
    separating the trapped ions according to mobility in the second ion mobility analyzer; and
    detecting the separated ions.

15. The method according to claim 14, wherein selected ions can be activated or reacted between the first and the second ion mobility analyzer or inside the second ion mobility analyzer while they are trapped.

16. The method according to claim 15, wherein the activation energy introduced into the selected ions is be varied in subsequent measurements in order to determine the mobility of the activated ions as a function of the activation energy.

17. The method according to claim 14, wherein the trapping time of the activated or reacted ions prior to their separation according to mobility is varied in subsequent measurements in order to determine the mobility of activated or reactant as a function of time.

18. An ion mobility spectrometer comprising an ion source, a first ion mobility analyzer, a second ion mobility analyzer located downstream of the first ion mobility analyzer, a fragmentation cell or reaction cell, which is located between the first and the second ion mobility analyzer or is part of the second ion mobility analyzer, and an ion detector wherein the second ion mobility analyzer is a trapped ion mobility spectrometry (TIMS) analyzer.

19. The ion mobility spectrometer according to claim 18, wherein the activation cell comprises means for radiative heating, like an infrared laser or an infrared laser diode, or means for generating dipolar or rotational acting electric AC fields.

20. The ion mobility spectrometer according to claim 18, wherein the fragmentation cell or the activation cell comprises an infrared light source and at least one optical element for focusing the emitted light along the axis or at one or more specific positions inside the trapping region of the second ion mobility analyzer.

21. The ion mobility spectrometer according to claim 18, further comprising an ion gate located between the first and the second ion mobility analyzer and a DC generator connected to the ion gate for supplying transient electric DC potentials to the ion gate.

* * * * *